US006553226B1

(12) United States Patent
Watson

(10) Patent No.: US 6,553,226 B1
(45) Date of Patent: Apr. 22, 2003

(54) METHOD FOR MANAGING INTERSATELLITE LINKS IN A LOW EARTH ORBIT SATELLITE SYSTEM

(75) Inventor: Jeffrey Lee Watson, Dallas, TX (US)

(73) Assignee: Nortel Networks LTD, St. Laurent (CA)

( * ) Notice: Subject to any disclaimer, the term of this patent is extended or adjusted under 35 U.S.C. 154(b) by 0 days.

(21) Appl. No.: 09/385,659

(22) Filed: Aug. 27, 1999

Related U.S. Application Data

(60) Provisional application No. 60/098,045, filed on Aug. 27, 1998.

(51) Int. Cl.⁷ .............................. H04Q 7/20; H04B 7/185
(52) U.S. Cl. ..................... 455/428; 455/13.1; 455/13.2; 370/316
(58) Field of Search ............................. 455/428, 427, 455/12.1, 13.1, 13.2, 9, 436; 370/316, 351, 322, 323, 324, 325, 326; 342/352, 355, 357.1, 357.15, 357.16

(56) References Cited

U.S. PATENT DOCUMENTS

| 5,471,641 | A | * | 11/1995 | Dosiere et al. | 455/13.2 |
| 5,579,536 | A | * | 11/1996 | Stackman et al. | 455/13.2 |
| 6,072,774 | A | * | 6/2000 | Natarajan et al. | 455/427 |
| 6,185,407 | B1 | * | 2/2001 | Watson | 455/13.2 |
| 6,198,907 | B1 | * | 3/2001 | Torkington et al. | 455/428 |
| 6,249,513 | B1 | * | 6/2001 | Malarky | 370/316 |

OTHER PUBLICATIONS

Keller et al., "Examination of the Circular Polar Satellite Constellation for the Use of Intersatellite Links", IEEE International Conference on Personal Wireless Communications, pp. 283–287, Dec. 17–19, 1997.*

Keller et al., "Geometric Aspects of Polar and Near Polar Circular Orbits for the Use on Intersatellite Links for Gobal Communication", 48th IEEE Vehicular Technology Conference, VTC '98, vol. 1, pp. 199–203, May 18–21, 1998.*

* cited by examiner

Primary Examiner—William Trost
Assistant Examiner—Rafael Perez-Gutierrez
(74) Attorney, Agent, or Firm—Bruce Garlick

(57) ABSTRACT

A method of managing inter-satellite links (ISLs) in a LEOS system. Intra-plane ISLs are established between a subject satellite and adjacent satellites in the same orbital plane. These intra-plane ISLs are generally fixed during all operations and will not be severed or reestablished once they have been initially established. Neighbor ISLs are established to minimize offset between a subject satellite and the neighboring satellites with which it has neighbor ISLs. However, satellites in the neighbor plane may be selected for neighbor ISLs which do no currently provide the minimal offset position but soon will based upon the continuing relative motion between the planes. Altering neighbor ISLs for an orbital plane is coordinated within a plane to eliminate loops and inefficient routing paths. Seam ISLs are also managed. When a satellite operates in a teardrop area (area in which the satellite provides some coverage), the satellite establishes seam ISLs to up to two seam satellites in a seam orbital plane. However, when the satellite moves into a mesh area, it may relinquish all seam ISLs. When such operation occurs, an ISL between the seam satellite previously having a link to the subject satellite may be established to a satellite in an adjacent plane.

24 Claims, 13 Drawing Sheets

METHOD FOR MANAGING INTERSATELLITE LINKS IN A LOW EARTH ORBIT SATELLITE SYSTEM

CROSS-REFERENCE TO RELATED APPLICATION

The present application claims priority pursuant to 35 U.S.C. Sec. 119(e) to U.S. Provisional Application Ser. No. 60/098,045, filed Aug. 27, 1998, which is hereby incorporated herein by reference in its entirety.

BACKGROUND

1. Technical Field

The present invention relates generally to satellite communication networks, and more particularly to a methodology for managing operation of a low earth orbit satellite (LEOS) system.

2. Related Art

Satellite communication systems are generally known to facilitate wireless communications across most areas of the earth's surface. Satellite communication systems may provide wireless coverage for mobile subscriber units in areas that are served neither by the public switched telephone network (PSTN) nor by cellular communication systems. The satellite communication systems may also provide a high bandwidth routing path for voice and data communications.

In a satellite communication system, at least one satellite operates from an orbit above the earth's surface. International telecommunication satellites typically operate from a geo-stationary orbit (GEO) that is approximately 36,000 kilometers above earth. Alternatively, telecommunication satellites have also been implemented in orbits closer to earth in low earth orbit satellite (LEOS) systems at an altitude from 700 kilometers to 2,000 kilometers or medium earth orbit satellite (MEOS) systems at approximately 10,000 kilometers.

In a LEOS system, a plurality of satellites orbit the earth and together provide coverage across most areas of the earth's surface. As contrasted to a GEO satellite system in which a single satellite provides coverage over a substantial geographic area for all times, in a LEOS system the coverage area of each orbiting satellite changes over time. Thus, a first LEOS system satellite will provide coverage for a geographic area during a first time period while another LEOS system satellite provides coverage for the geographic area for a second time period, etc.

In a typical LEOS configuration, satellites are organized into orbital planes. A plurality of satellites orbits the earth in the orbital plane such that the satellites pass near the south pole and the north pole during their orbits. The satellites of each orbital plane are substantially uniformly distributed about the orbital plane and, as a whole, provide coverage for a geographic area corresponding to the orbital plane. By providing a plurality of orbital planes, each of which is separated from adjacent orbital planes by a separation angle, communications across a significant portion of the earth's surface are supported.

The number of orbital planes, the number of satellites in each orbital plane, the separation of the orbital planes, the altitude of the satellites in each orbital plane, and the inclination of each orbital plane characterizes the "constellation" of the LEOS system. The constellation essentially describes the relative positions and motion of the satellites in the LEOS system.

The LEOS system is called upon to service terrestrial communications between sources and destinations. Sources and destinations are devices that couple communications to the LEOS system. A source or destination may be a wireless subscriber unit, an earth station, which couples the LEOS system to the PSTN or another communication network, or any other wireless device that couples to one of the satellites.

In a LEOS system, communications are not only coupled from sources and destinations to satellites, but they may be coupled between satellites as well via intersatellite links (ISLs). For the purposes of overall communication path length evaluation, each ISL may be referred to as a "hop." Each hop consumes LEOS system resources and adds delay to the communication. Thus, it is desirable to minimize the number of hops within the LEOS system when coupling communications between sources and destinations. However, the number of hops between a first satellite servicing a source and a second satellite servicing a destination depends upon system routing behavior and the positions of the source and destination. System routing behavior is based not only upon programmed permissible ISLs between satellites but upon the LEOS system constellation as well.

Once a LEOS system is built and the satellites are deployed, it must be efficiently operated in order to maximize system capacity and to meet a desired grade of service. During normal operation, because satellites orbit the earth and alter their relative positions with respect to one another, ISLs are established and broken on a regular basis. With hundreds of satellites deployed in a typical LEOS system, however, determining which ISLs to establish, when to establish ISLs and when to break the ISLs is a difficult task.

Thus, there is a need in the art for a methodology for managing ISLs in a LEOS system so that the available resources of the LEOS system are efficiently used to adequately service communication load.

SUMMARY OF THE INVENTION

To overcome the shortcomings of the prior systems and their operations, a method according to the present invention manages inter-satellite links (ISLs) in a LEOS system. According to a first aspect of the present invention, intra-plane ISLs are established between a subject satellite and adjacent satellites in the same orbital plane. These intra-plane ISLs are generally fixed during all operations and will not be severed or reestablished once they have been initially established.

According to another aspect of the present invention, neighbor ISLs (i.e., ISLs between a subject satellite in a first orbital plane and neighbor satellites in an adjacent orbital plane) are established to minimize offset. While the distance of the ISLs may not be minimized for all times, by selecting neighbor ISLs to minimize offset, the links may be more easily selected and managed. Further, neighbor links are coordinated between a subject plane and a neighbor plane to eliminate loops and inefficient routing paths.

In managing neighbor ISLs according to the present invention, a reference satellite is selected. The offset to three neighboring satellites in a neighbor orbital plane is then determined. Of these three offsets, the two smaller offsets (and corresponding satellites) are selected. System conditions will dictate when the neighbor ISLs for a particular orbital plane will be altered. System load, satellite loading and satellite coverage may all be considered in determining whether to alter the neighbor ISLs. When it is determined that neighbor ISLs are to be altered for an orbital plane, the neighbor ISLs for all satellites in the orbital plane will be altered in a coordinated fashion. In another operation, satellites in the neighbor plane may be selected for neighbor ISLs which do no currently provide the minimal offset position but soon will based upon the continuing relative motion between the planes.

According to still another aspect of the present invention, seam ISLs are managed. When a satellite operates in a teardrop area (area in which the satellite provides some coverage), the satellite establishes seam ISLs to up to two seam satellites in a seam orbital plane. However, when the satellite moves into a mesh area, it may relinquish all seam ISLs. When such operation occurs, an ISL between the seam satellite previously having a link to the subject satellite may be established to a satellite in an adjacent plane. By removing the subject satellite from the ISL routing when it has no coverage area, communications are more efficiently routed and routing delays are reduced.

Other aspects of the present invention will become apparent with further reference to the drawings and specification that follow.

BRIEF DESCRIPTION OF THE DRAWINGS

A better understanding of the present invention can be obtained when the following detailed description of the preferred embodiment is considered with the following drawings, in which.

DETAILED DESCRIPTION OF THE DRAWINGS

Figure 1:
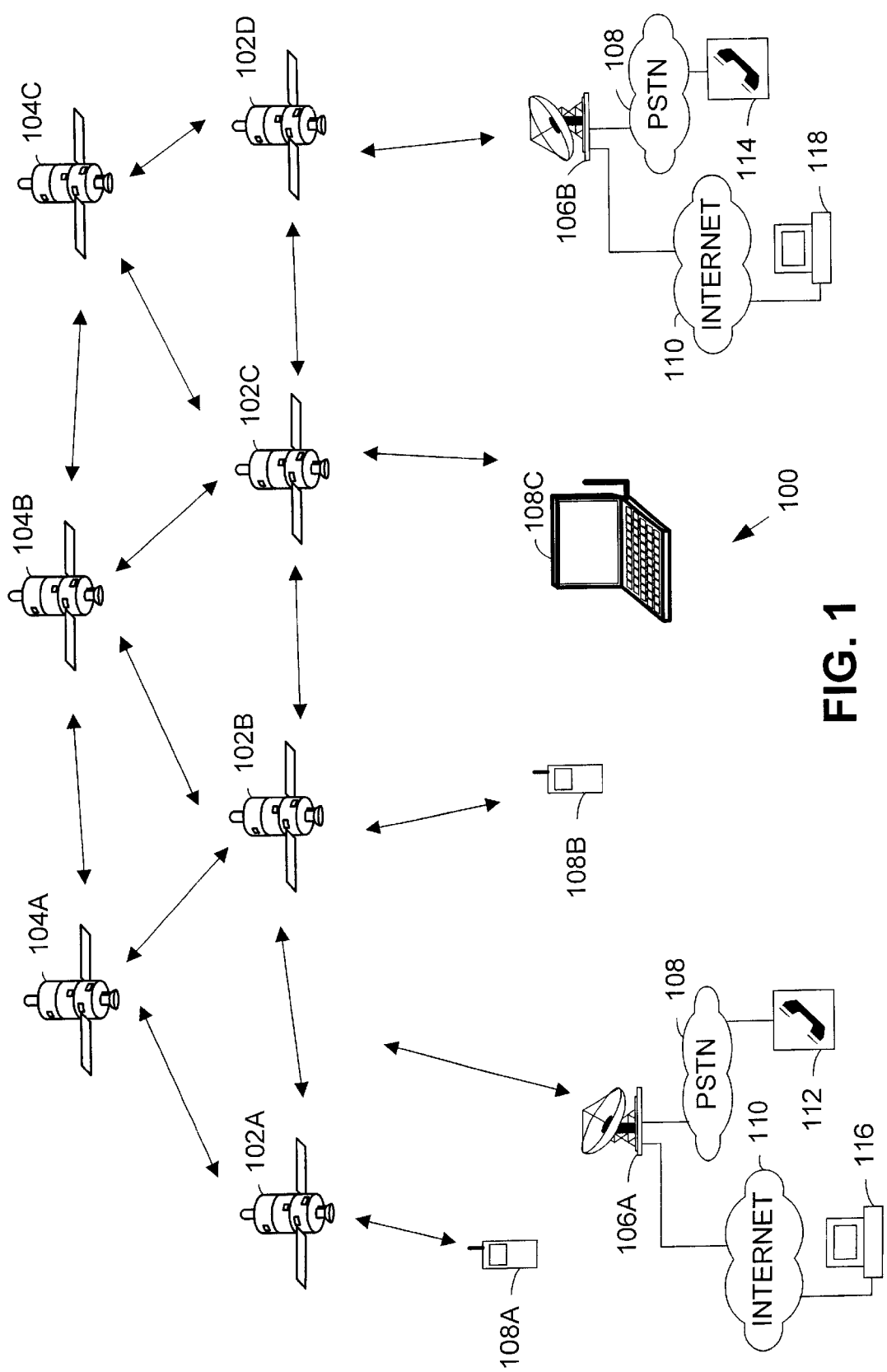
FIG. 1 is a system diagram generally illustrating some of the components of a low earth orbit satellite (LEOS) system, communication systems which couple to the LEOS system and a plurality of devices serviced by the LEOS system, the operation of which proceeds according to the present invention.

FIG. 1 is a system diagram generally illustrating some of the components of a low earth orbit satellite (LEOS) system, communication systems which couple to the LEOS system and a plurality of devices serviced by the LEOS system, the operation of which proceeds according to a preferred embodiment of the invention. In the LEOS system 100, a plurality of satellites 102A–102D and 104A–104C orbit the earth and, in combination with earth stations 106A and 106B, service communications for a plurality of wireless subscribing units 108A, 108B and 108C. The earth stations 106A and 106B couple to the Public Switched Telephone Network (PSTN) and the Internet 110 (or another packet switched network). With these interconnections, the LEOS system 100 facilitates communications between mobile wireless subscribing units 108A–108B, fixed wireless unit 108C, and with telephones 112 and 114 or computers 116 and 118, for example. The communication operations provided by the LEOS system 100 service both voice and data communications. These types of communications are generally known and will be described herein only to expand upon the teachings of the present invention.

The LEOS system satellites are organized into a plurality of satellite groups. Each satellite group orbits about the earth in an orbital plane (the orbital planes will also be referred to herein interchangeably as "planes"). Within the orbital plane, the satellites of the satellite group are distributed as evenly as possible so that the angular position between each adjacent pair of satellites within the orbital plane is substantially uniform. To provide global coverage, the orbital planes are highly inclined relative to the equator such that the angle formed between the orbital plane and the equatorial plane is greater than 70 degrees. The orbital planes are also distributed so that, at the equator, the distance between each adjacent pair of orbital planes is substantially uniform. In the example of FIG. 1, satellites 104A, 104B and 104C operate in a first orbital plane while satellites 102A, 102B, 102C and 102D operate in a second orbital plane.

The orbital characteristics of the satellites of a LEOS system are referred to as its "constellation." In the particular examples provided herein, the constellation of the LEOS system includes: (1) nominal altitude is 1375 kilometers; (2) twelve orbital planes; (3) twenty-four satellites in each orbital plane; (4) orbital planes are separated by 2 kilometers in altitude; (5) nominal 84.7° inclination, but each orbital plane is at a slightly different inclination to equalize the nodal drift rates; (6) constellation provides full earth coverage; (7) constellation design Mask Angle is 15.36°; (8) the orbital plane nodal spacing is 15.36°; and (9) the footprint cross-track width is 15.294° (1702.52 kilometers) and the footprint along the track size is 15° (1669.79 kilometers). In this constellation, each satellite services a geographic area of the earth's surface. Because the satellites are orbiting the earth, however, the geographic area serviced by each satellite changes over time.

Each communication serviced by the LEOS system includes a source and a destination, the source and the destination each representing a terrestrial terminal or earth station. For example, when wireless subscribing unit 108B communicates with telephone 112, the source is earth station 106A while the destination is the wireless subscribing unit 108B. In the case of this communication, the earth station 106A is fixed with respect to the earth's surface. However, the wireless subscribing unit 108B may be mobile. In any case, the source and the destination reside a distance apart. In the case of the present example, the earth station 106A establishes a link with satellite 104A. Further, the wireless subscribing unit establishes a link with satellite 102B.

Further, to service the communication, an intersatellite link (ISL) is utilized between satellite 102B and satellite 104A. In another example, a communication is serviced between computer 118 coupled to the Internet 110 and wireless subscriber unit 108C. The communication passes from the Internet 110 to earth station 106B and then on a link to satellite 102D. The communication is then routed on an ISL between satellite 102D and satellite 102C and on a link to wireless subscriber unit 108C. Because the satellites orbit the earth on a periodic basis, handoff must occur between satellites. Further, because relative positions of neighboring satellites change over time, ISLs also change over time. Operation according to the present invention sets forth methodologies for establishing and breaking ISLs.

The following terms are used throughout in describing the present invention:

Intra-plane ISLs connect a satellite to another satellite within the same orbital plane. Each satellite has one link with the leading satellite and one link with the trailing satellite within the orbital plane. Barring equipment failures, a particular intra-plane link will always connect a particular satellite pair. Excluding potential sun or other interference outages, these links will remain active all of the time.

Inter-plane ISLs connect a satellite to another satellite that resides within a differing orbital plane.

A neighbor link (ISL) is an inter-plane ISL between satellites in adjacent ascending planes or in adjacent descending planes. Each satellite may have as many as two neighbor links to satellites in the plane to the east and as many as two more to satellites in the plane to the west. These links are shut down at extreme north and south latitudes. While the present discussion contemplates two neighbor links to each neighboring plane, operation according to the present invention may be extended to systems in which other numbers of neighbor links may be established to each neighboring plane.

A seam link ISL is an inter-plane ISL between a satellite in an ascending plane and a satellite in a descending plane. A satellite may have as many as two seam links. Seam links exist primarily between satellites in plane 1 and plane 12, however planes 2 and 11 will also have seam links in the mesh areas. While the present discussion contemplates two seam links, operation according to the present invention may be extended to systems in which other numbers of seam links may be established.

Minimum distance alignment of satellites: A pair of satellites in adjacent, same direction orbital planes which arrive at the cross-over point of the orbital planes at the same time have the minimum distance alignment. The maximum separation over a full orbit of a pair of satellites with this alignment will be less than the maximum separation for a pair of satellites with any other alignment. This maximum occurs 90° away from the crossover point. For 84.7° inclination and 15.36° nodal separation, adjacent orbital planes cross over at a point which is 0.714° prior to the eastern orbital plane reaching its most northern latitude and 0.714° following the western orbital plane reaching its most northern latitude. Rotating each satellite backwards 90° in its orbit from the crossover point, the satellite in the eastern orbital plane is 0.714° along its orbit south of the equator and the satellite in the western orbital plane is 0.714° along its orbit north of the equator. At this point, the direction from either satellite to the other is 90° relative of the velocity vector.

Skew between orbital planes: This indicates the shift in satellite positions between adjacent, same direction orbital planes relative to the minimum distance alignment. The skew is defined as the minimum angular offset of a satellite in the orbital plane to the east relative to the zero skew position with advance along the orbit considered a positive angle. The skew between two orbital planes will be in the range −7.5° to 7.5°. This definition of skew assumes that the satellites within each orbital plane are perfectly spaced at 15°. Two orbital planes which have a skew of zero will have 24 pairs of satellites with the minimum distance alignment. Orbital planes with a skew of zero are referred to as aligned or synchronized.

Offset between satellites: This is the angular offset of a satellite in the orbital plane to the east relative to the zero skew location from the perspective of a reference satellite in the orbital plane to the west.

Mesh area: Refers to the region around one of the two crossover points of orbital plane 1 with orbital plane 12.

Teardrop area: Refers to the region opposite the mesh where orbital plane 1 and orbital plane 12 have the greatest separation.

Pass: Refers to the portion of a half-orbit, centered at the equator, during which a satellite is available to provide service to users in its footprint.

In a first example of operation according to the present invention, satellites 102A–102D are in plane 1 while satellites 104A–104C are in plane 2. Since plane 1 and plane 2 orbit about the earth with the same rotation, neighbor ISLs are formed between satellites 102A–102D and 104A–104C. Operation according to the present invention determines how these neighbor ISLs are established and broken. According to the present invention, neighbor ISLs are established so that the magnitude of offsets are minimized. Further, according to the present invention, connectivity of neighbor ISLs within a plane are established and broken considering loading of the LEOS system, locations of the satellites when the neighbor ISLs are modified and system capabilities (e.g., the number of neighbor ISLs that may be serviced). Further, all satellites in a plane under consideration will have their neighbor ISLs managed consistently.

In a second example of operation according to the present invention, satellites 102A–102D are in plane 1 while satellites 104A–104C are in plane 12. Thus seam ISLs are established and broken according to the present invention between satellites 102A–102D and 104A–104C. In teardrop areas, seam ISL operation according to the present invention causes seam ISLs to be established and broken at regular intervals according to the relative angular position of the satellites between the planes 1 and 12. In mesh areas, seam ISLs for satellites in plane 1 will be broken and not established until the satellites exit the mesh area. In such case, seam ISLs are established between the satellites of plane 2 and plane 12. Such is the case because not all satellites are required in order to service the mesh area. After the satellites exit the mesh area, the teardrop area seam ISL rules then apply.

Figure 2:
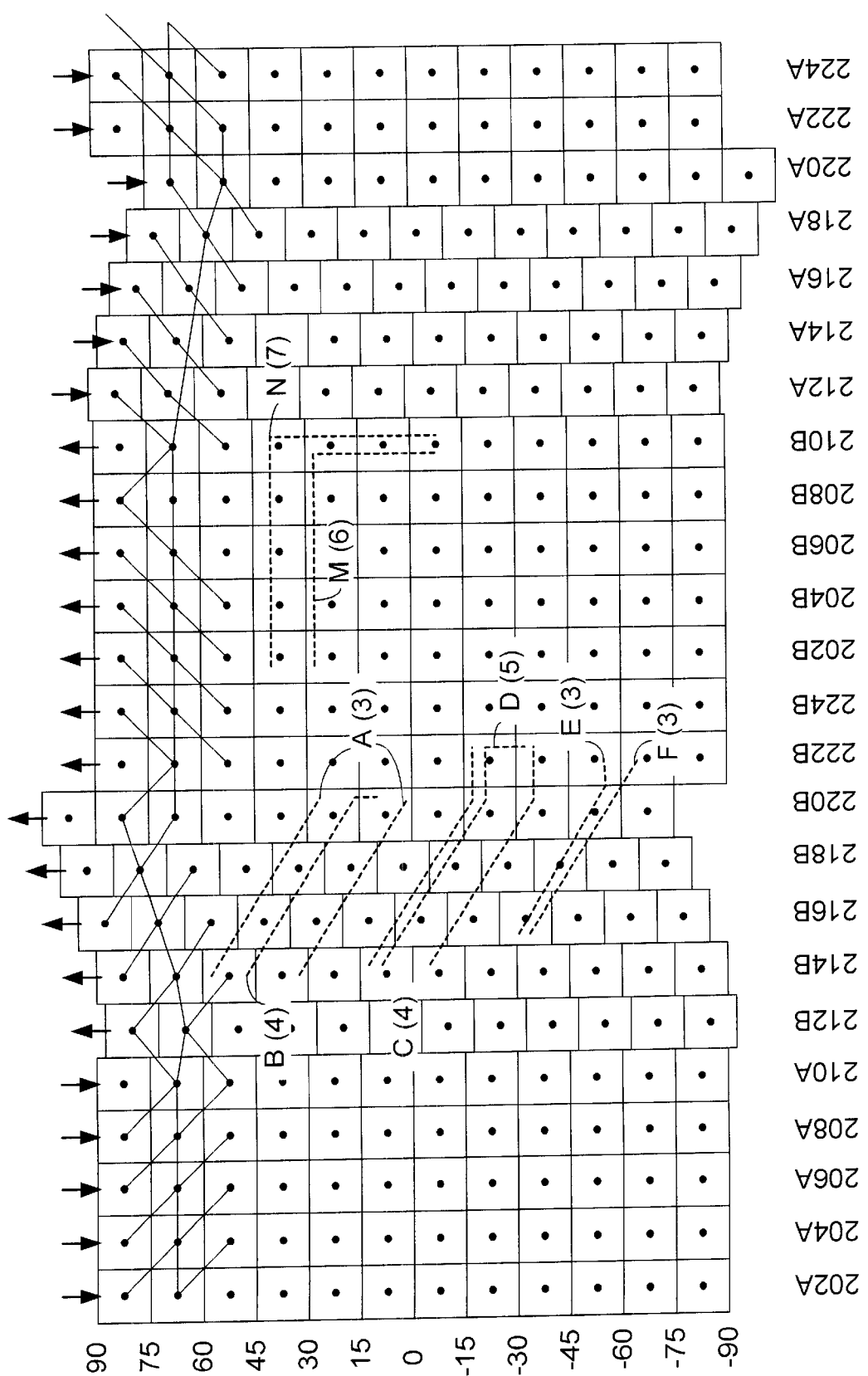
FIGS. 2 is a constellation representation of a LEOS system illustrating communication paths between source and destination and the manner in which communication paths vary over time.

FIG. 2 is a constellation representation of a LEOS system illustrating communication paths between source and destination and the manner in which communication paths vary over time. Vertical columns each represent one-half of an orbital plane of the LEOS system. The columns having arrows pointing up (202B–224B) are the south-to-north moving (ascending) halves of the orbital planes while the columns having arrows pointing down (202A–224A) are the north-to-south moving (descending) halves of the orbital planes. Each column representing a north-to-south moving half of an orbital plane corresponds to a column representing a south-to-north moving half of an orbital plane. For example, column 202A represents a north-to-south moving half of an orbital plane while column 202B represents the south-to-north moving half of the orbital plane. A seam is defined where a north-to-south moving orbital plane is adjacent a south-to-north moving orbital plane, e.g., 210A/212B and 210B/212A.

The operations described herein for managing ISLs are typically performed using a digital computer. The digital computer may reside within a satellite that manages its own intersatellite links. Alternately, the digital computer may reside in an earth station with the earth station directing the satellite to establish and sever ISLs. Further, a first digital computer may reside within the satellite and another digital computer may reside in the earth station. In any case, the operation is embodied in software instructions that are received and processed by the digital computer(s). The results of the operation are relayed to the appropriate hardware device(s) to cause the ISLs to be established and severed. These software instructions may be embodied upon one or more storage device(s) such as one or more floppy diskettes, CD ROMs, DVDs, magnetic tapes and other portable storage devices. Further, these software instructions may be embodied in one or more coupled memory devices, including hard disk drive(s), ROM, RAM and other types of storage devices and/or memory contained in a digital computer. The structure and operation of digital computers is generally known and will not be discussed further. However, software instructions embodying the present invention will include instructions for accomplishing the operations of the present invention.

In FIG. 2, the neighbor ISL and seam ISL connectivity for all satellites in a column (half plane) is shown by connectivity of second satellite in the column. The second row is used only to give the pattern because the satellites at this latitude will quite likely have the neighbor and seam ISLs shut off. Intra-plane ISLs are not shown for the satellites. However, each satellite will include ISLs to its two adjacent intra-plane satellites.

As illustrated, there are 24 satellites in each orbital plane and there are 12 orbital planes in total. Thus, adjacent satellites in the same orbital plane are separated by 15° relative to the center of the earth. The coverage and alignment of the satellites change as the satellites move relative to a source and destination and relative to one another.

Figure 3A:
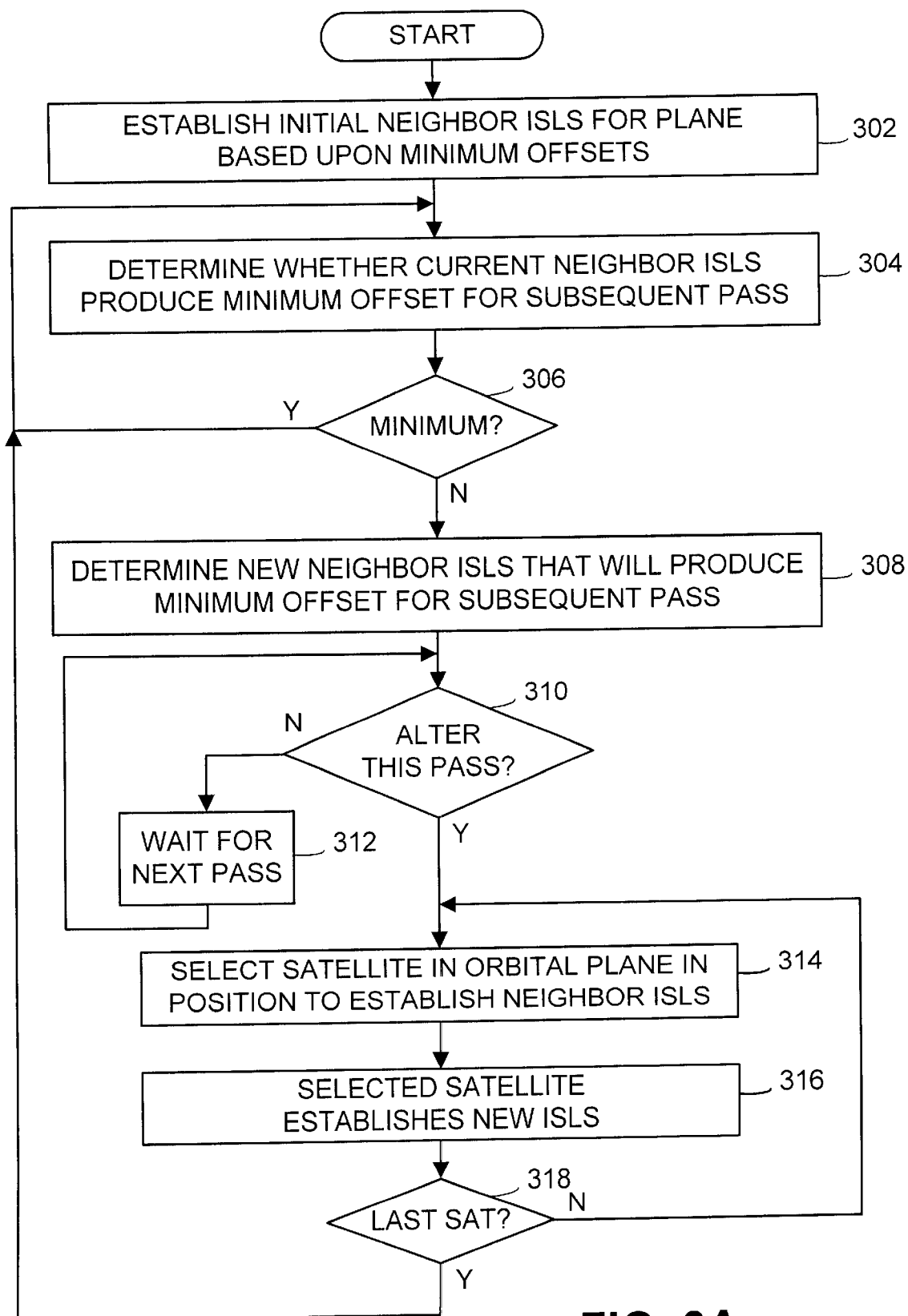
FIG. 3A is a logic diagram illustrating, in general, operation according to the present invention in establishing and severing neighbor inter-satellite links (ISLs) in a LEOS system.

FIG. 3A is a logic diagram illustrating, in general, operation according to the present invention in establishing and severing neighbor inter-satellite links (ISLs) in a LEOS system. In general, the algorithm for neighbor link connectivity is:

For each satellite, each neighbor link is established at the start of a pass and is maintained for the duration of the pass.

The neighbor links are planned prior to each ascending or descending pass based primarily on the skew between the satellite planes. The two neighbor links to an adjacent plane connect the satellite to the two satellites which have the two smallest magnitude offsets (these are not necessarily always the two closest satellites as is discussed below). The impact upon the overall network connectivity must also be taken into account and may affect the selection of neighbor links as described below.

On a descending pass, the neighbor links are established after both satellites reach (70° N) latitude and are maintained until either satellite reaches (70° S) latitude. Similarly, on an ascending pass, the neighbor links are established after both satellites reach (70° S) latitude and are maintained until either satellite reaches (70° N) latitude.

With 15° spacing between satellites in a plane, there will be at least two satellites in a neighbor plane with an offset of magnitude 15° or less. For example, a skew of 5° gives one satellite with 5° offset and one with −10° offset. The next two closest satellites are at 20° and −35° offset. The two neighbor ISLs would obviously connect the reference satellite to the 5° and −10° offset satellites.

The greatest offset that must be supported by a neighbor ISL is approximately 15° and occurs when the skew between planes is 0°. A skew of 0° will result in one satellite with an offset of 0°, one with an offset of 15° and one with an offset of −15°.

Referring now particularly to FIG. 3A, operation commences where initial neighbor ISLs for the orbital plane are established (step 302). This initial neighbor ISL assignment will be the same for each satellite in the orbital plane and will be fixed for each pass for each satellite in the orbital plane. This initial neighbor ISL determination is made such that the neighbor ISLs with respect to a reference satellite, in total, have a minimum offset. Then, it is determined whether the current neighbor ISLs will produce a minimum offset for a subsequent pass (step 304). If the current neighbor ISLs will produce a minimum offset for a subsequent pass (as determined at step 306), operation returns to step 304.

However, if the current neighbor ISLs will not produce a minimum offset for a subsequent pass, new neighbor ISLs are determined that will produce a minimum offset for the subsequent pass (step 308). As will be discussed later, three satellites in the neighbor plane will have a minimum offset with respect to the reference satellite. Since one of the three satellites will be nearest to the same latitude (at the equator) of the reference satellite, it will be selected for a neighbor ISL to the reference satellite. Then, one of the other two satellites will be selected, the one selected having an overall lesser offset.

This lesser offset may not be currently achieved, but will be subsequently achieved. Thus, in some operations, neighbor ISLs are managed preemptively to achieve a desired operation. Because loading varies over time, this preemptive neighbor ISL modification may be employed to prevent any communication load interruption that would occur if the neighbor ISLs were modified in a heavier loading period.

Then, it is determined whether the new neighbor ISLs should be established during the next pass (step 310). When altering neighbor ISLs, routing between satellites will be affected. Such alteration of routing may temporarily affect the ability of the LEOS system to route communications. Thus, if the particular satellites under consideration for neighbor ISL alteration are heavily loaded, it may be desirable to delay the severing and establishment of neighbor ISL operations. Further, if the satellite passes over an area of heavy loading, the neighbor ISL alteration may affect the ability of the satellite(s) under consideration to service the load. In such case, the severing and establishment operations may also be delayed. Thus, if the operations are not to be performed on this pass (as determined at step 310), the operations are delayed until the next pass (step 312) at which time the decision (step 310) is reconsidered.

When a decision to alter the neighbor ISLs is reached, each satellite in the orbital plane must have its neighbor ISLs altered so that the neighbor ISLs for the orbital plane are coordinated. In doing so, one of the satellites in the orbital plane is selected as the first satellite for neighbor ISL modification. This satellite may be a reference satellite for the orbital plane or may simply by a satellite selected based upon its orbital position. When this satellite reaches a selected position in its orbit, establishment of the new neighbor ISLs is initiated (314). Then, the new neighbor ISLs for the selected satellite are established (step 316). Then, the operations of steps 314 and 316 are repeated for each satellite in the orbital plane until the last satellite has been operated upon (as determined at step 318). From step 318, operation returns to step 304.

Figure 3B:
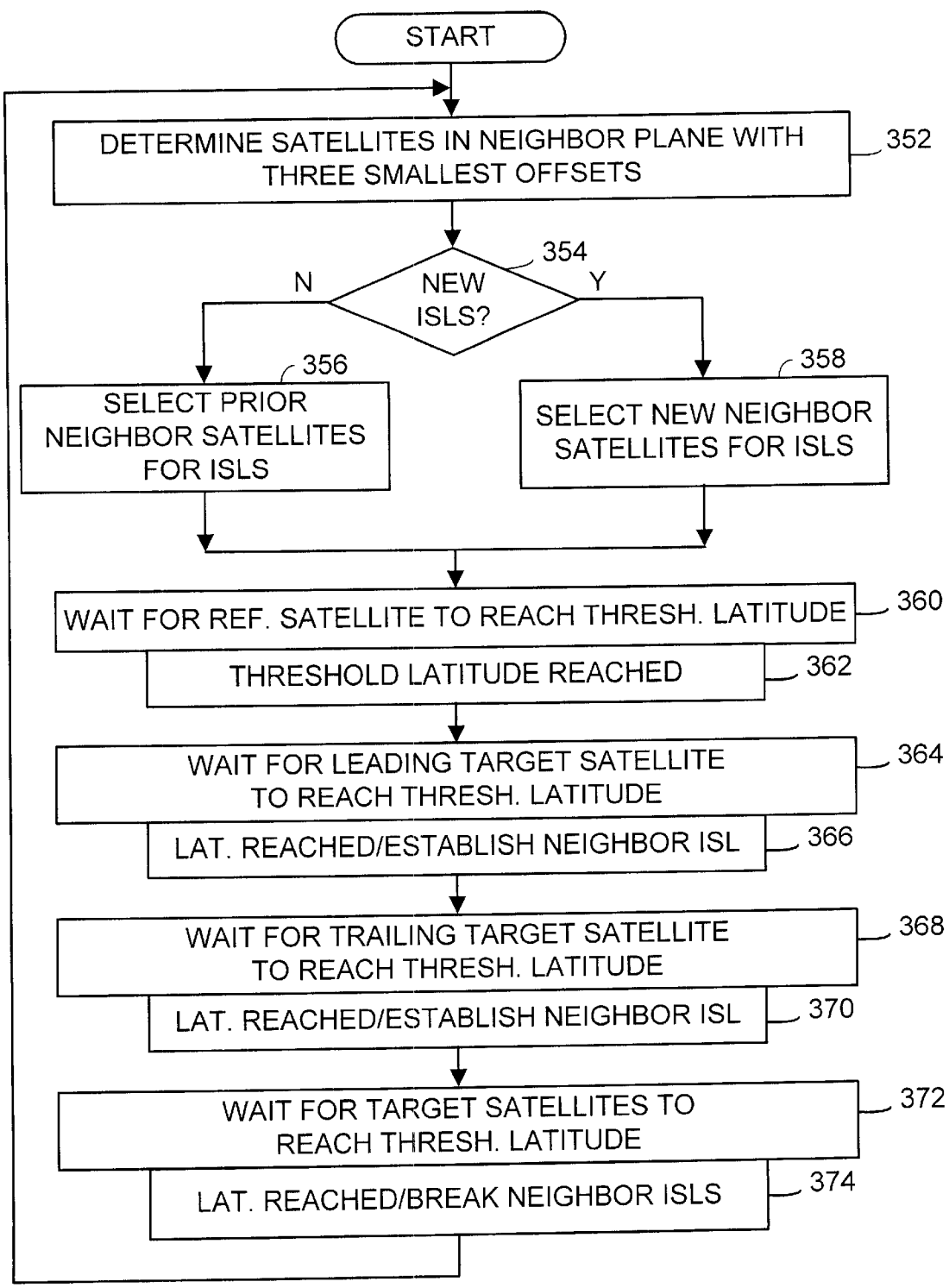
FIG. 3B is a logic diagram illustrating, in more detail, operation according to the present invention in establishing and severing neighbor ISLs in a LEOS system.

FIG. 3B is a logic diagram illustrating, in more detail, operation according to the present invention in establishing and severing neighbor ISLs in a LEOS system. Operation commences by determining the three satellites in a neighboring plane that will have the smallest offset with respect to a reference satellite in a subsequent pass (step 352). Then, the two satellites with the smallest offset are compared to the two neighbor ISL satellites. If the satellite pairs differ, new neighbor ISL connectivity is warranted. If the satellite pairs do not differ, new neighbor ISL connectivity is not warranted. The subsequent pass under consideration may be the next pass or it may be a pass in the future.

Preemptive neighbor ISL formation is performed when neighbor ISLs are altered prior to the time that the new neighbor ISL configuration produces a smallest offset for the next pass but will produce a smallest offset for a future, subsequent pass. These preemptive neighbor ISL operations may be performed during minimum loading periods to preclude performing the neighbor ISL alteration during heavier loading periods.

At step 354, it is determined whether to establish new neighbor ISL connectivity. If new neighbor ISL connectivity is warranted, and it is determined from a system perspective that this new connectivity should be employed in this pass, the new neighbor satellites are selected for ISLs. (step 358). However, if new neighbor ISL connectivity is warranted, but cannot be implemented due to system concerns (e.g., loading, routing, coverage area, etc.) during the current pass, or if new neighbor ISL connectivity is not warranted, the prior neighbor satellites are selected for neighbor ISLs (step 356).

Since neighbor ISLs are typically severed in the mesh area on each pass, they must be reestablished when starting a pass. Operation presupposes that this operation has occurred and a subject satellite is beginning a pass. Thus, operation waits until the subject satellite reaches a threshold latitude (step 360) upon leaving the mesh area. When the threshold latitude is reached (step 362), operation proceeds to wait for a selected leading target satellite in the neighbor plane to reach another threshold latitude (step 364). When this threshold latitude is reached (step 366), a neighbor ISL is established from the subject satellite to the leading target satellite in the neighbor plane (step 366).

Then, operation resumes by waiting for a selected trailing satellite in the neighbor plane to reach a threshold latitude (step 368). When the selected trailing satellite in the neighbor plane reaches this threshold latitude, a neighbor ISL is established from the subject satellite to the selected trailing satellite in the neighbor plane (step 370).

The neighbor ISLs are maintained until the subject satellite reaches a threshold latitude near the completion of the pass (step 372). At that point, the neighbor ISLs between the subject satellite and the selected neighbor satellites of the neighbor plane are broken (step 374). In the described example, the neighbor ISL to the selected leading neighbor satellite is severed at one time and the neighbor ISL to the selected trailing neighbor satellite is severed at a later time. From step 374, operation returns to step 352.

The operation of FIG. 3B is repeated for each satellite of the constellation. Thus, the operations of FIG. 3B are directed primarily to a subject satellite and these operations are repeated for each satellite and orbital plane in the constellation. In one particular operation, steps 352–358 are performed for all satellites in a given orbital plane and steps 360–374 are performed for each satellite in the orbital plane at the appropriate times.

Figure 4:
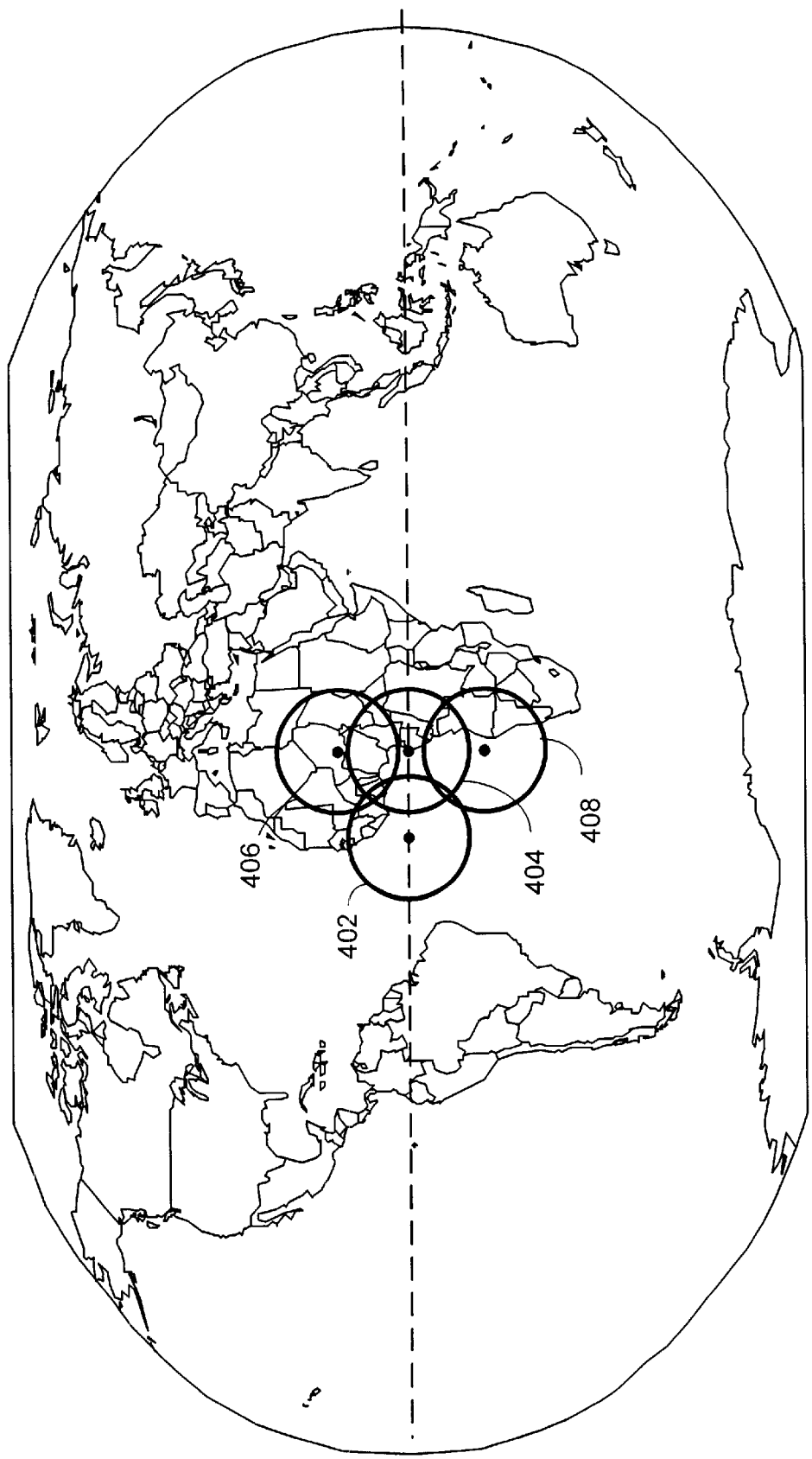
FIG. 4 is an earth diagram illustrating the relative position of satellites in neighboring orbital planes and the relative offsets of adjacent satellites.

FIG. 4 is an earth diagram illustrating the relative position of satellites in neighboring orbital planes and the relative offsets of adjacent satellites. It is assumed in FIG. 4 that the satellites are in neighboring planes, both of which are ascending. In order to focus on the effect of the skew, the orbital altitudes of the two planes considered are both set at 1375 km. Thus the skew between the planes remains constant. The effect of the 2 km separation in orbital altitude will be addressed in the next section.

An offset of 0° gives the minimum link length. One of the neighbor links from the reference satellite, T_ref (coverage area 402), will connect it to the satellite at 0° offset, T_0 (coverage area 404). The second neighbor link will either connect T_ref to T_15 (coverage area 406) for the duration of the pass or will connect T_ref to T_−15 (coverage area 408) for the duration of the pass. A result of this approach to neighbor link connectivity is that the two neighbor links are not always connected to the two closest adjacent plane satellites.

Figure 5:
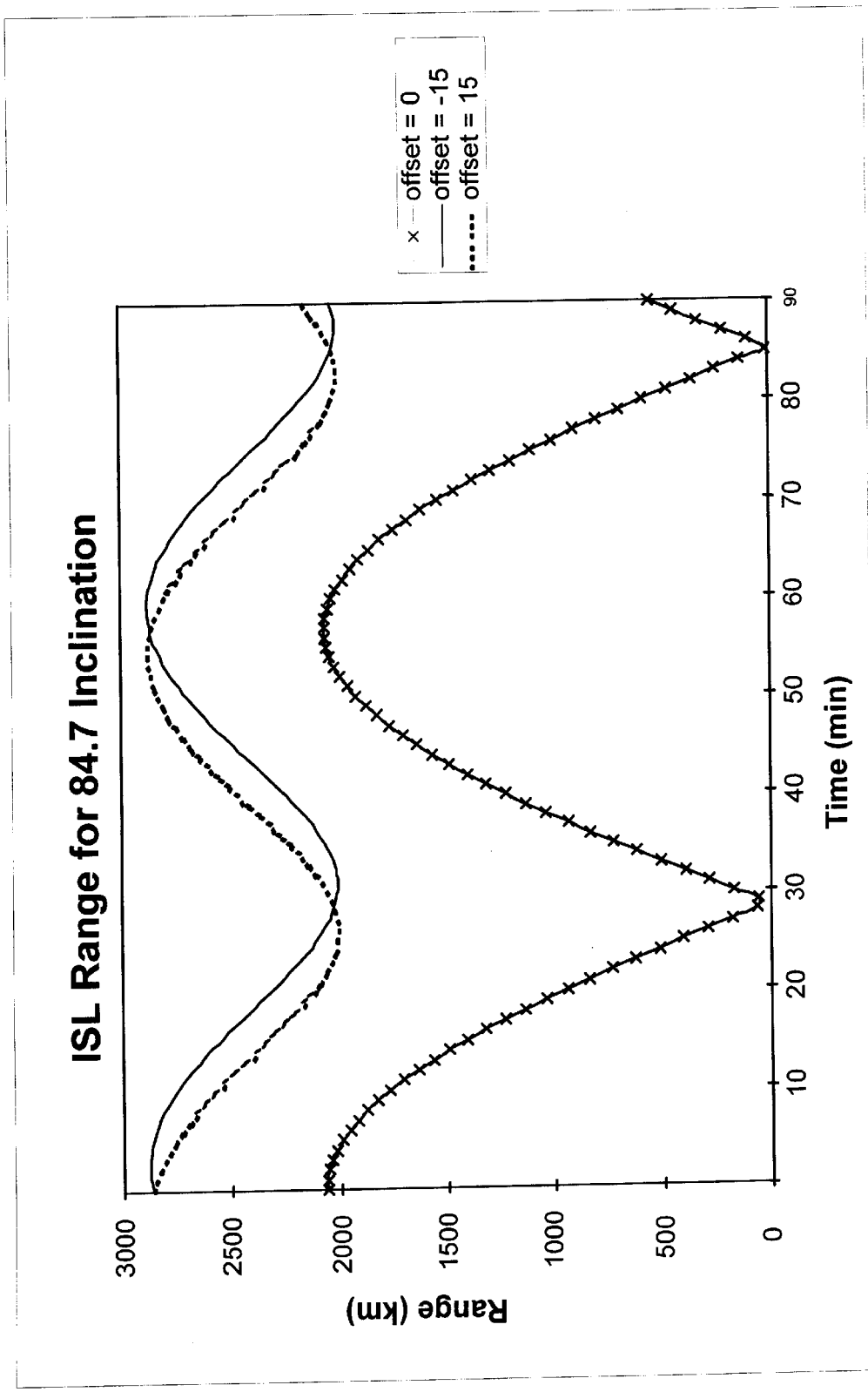
FIG. 5 is a graph illustrating the variation in separation between neighboring satellites in a LEOS system over time.

FIG. 5 is a graph illustrating the variation in separation between neighboring satellites in a LEOS system over time. In particular, FIG. 5 shows the time varying distance to its three closest satellites. At T=0, the reference satellite T_ref is at the equator. At this moment, the distance from T_ref to T_15 is equal the distance to T_−15. As the satellites ascend, the distance from T_ref to T_15 decreases as the separation between orbital planes decreases. However, since T_ref and T_−15 are on opposite sides of the equator for the first 4 minutes, the separation increases slightly before beginning to decrease. This is indicated by the lag of the range plot of T_−15 relative to that of T_15.

The descending pass extends from T≈35 minutes to T≈79 minutes. During this period, the distance to T_−15° offset is smaller until the reference satellite reaches the equator (at T≈57 minutes.) Then the distance to the T_15° becomes smaller.

According to the algorithm for neighbor ISL connectivity stated above, the second ISL will be established with either T_−15 or T_15 and maintained throughout the descending pass. If instead, the second neighbor ISL were chosen to always connect to the closer satellite (thus switching over at the equator), the maximum range for this ISL would not be reduced by much though the average link length might be reduced by about 100 km. However, this mid-pass switch approach has the negative performance impacts listed below which more than offset the slight ISL length reductions.

1) Satellite T_ref would have an ISL switching time during which it would have only 1 eastward neighbor ISL.

2) From the time that T_ref switches from T_−15 to T_15 until the satellite that is trailing T_ref in its plane reaches the equator (roughly 283 seconds) T_−15 will have only one westward neighbor ISL.

Figure 6:
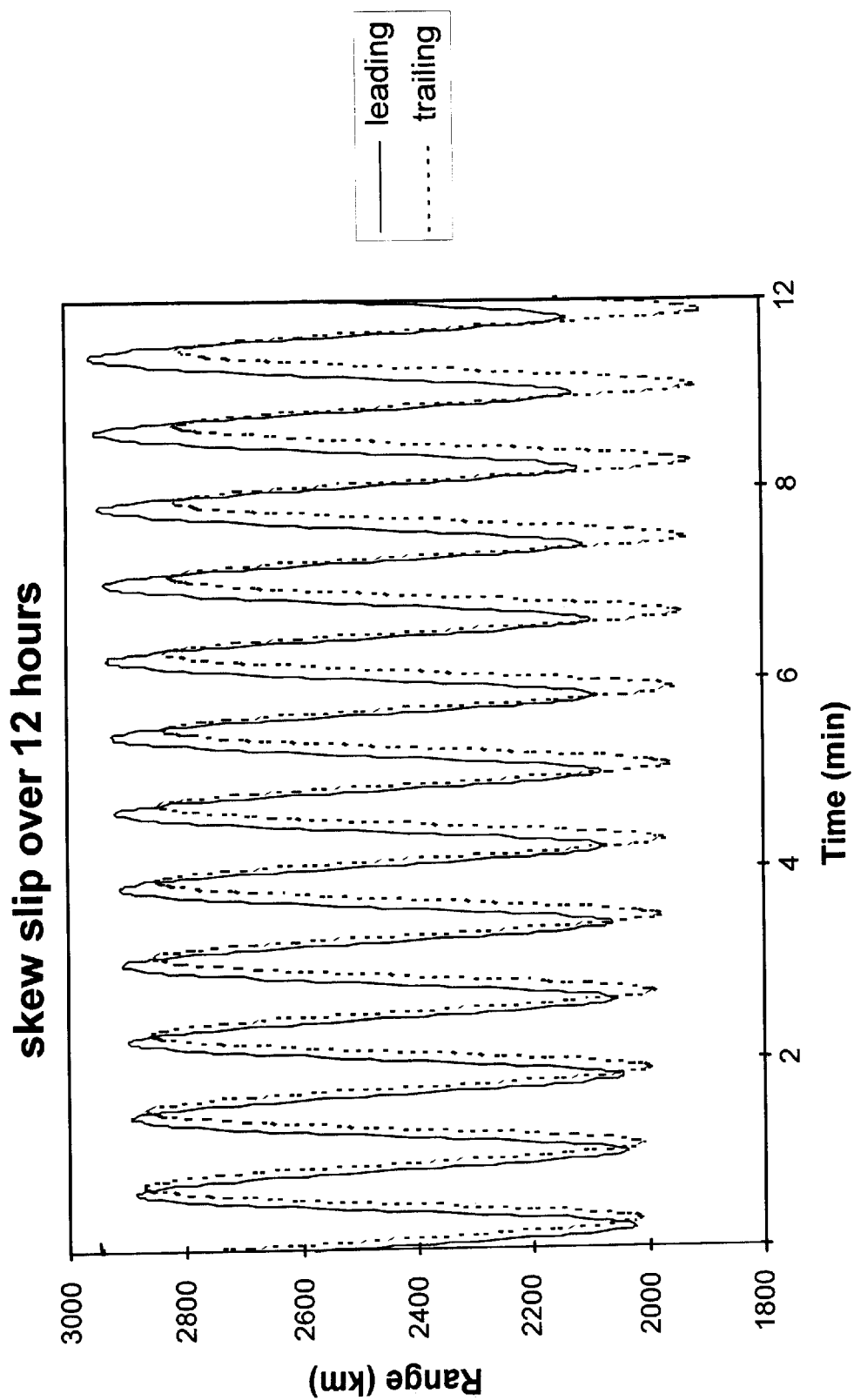
FIG. 6 is a graph illustrating the variation in separation between neighboring satellites in a LEOS system over time to illustrate slip between neighboring orbital planes over time.

FIG. 6 is a graph illustrating the variation in separation between neighboring satellites in a LEOS system over time to illustrate slip between neighboring orbital planes over time. Since the orbits vary in altitude, there is a continual slip in the skew between planes. The orbital period at 1375 km is 6794.0 seconds and the nominal separation between each of the satellites in a plane is 283 seconds. The orbital period at 1377 km is 6796.7 seconds, 2.7 seconds longer than the orbital period at 1375 km. Thus, in just over 100 orbits, the skew will slip by 15° (satellites within a plane are separated by 15° corresponding to 283 seconds which is the advance the lower plane makes on the higher plane in 283/2.7=105 orbits.)

In a single ascending or descending pass, the skew slips by less than a tenth of a degree (15° in 105 orbits equates to 140/360*15°/105=0.056° in a pass from 70° N to 70° S). Since the slip per pass is so small, it does not force the neighbor link connectivity algorithm to be modified to accommodate it. Specifically, if a neighbor link were established to a satellite with an offset of 15° at the start of a pass, by the end of the pass, the offset would have only increased to 15.056°.

The plot of FIG. 6 gives the range from the reference satellite to satellites which are initially (T=0) at +15° offset (leading) and −15° offset (trailing) as the skew between planes slowly increases. The reference satellite has an orbital altitude of 1377 km and the other two are in the adjacent plane to the east at 1375 km orbital altitude. The maximum range over a pass increases by about 6 km each pass for the leading satellite and decreases by roughly the same amount for the trailing satellite. This is roughly a 0.2% increase (decrease) in maximum range each pass.

Figures 7A, 7B:
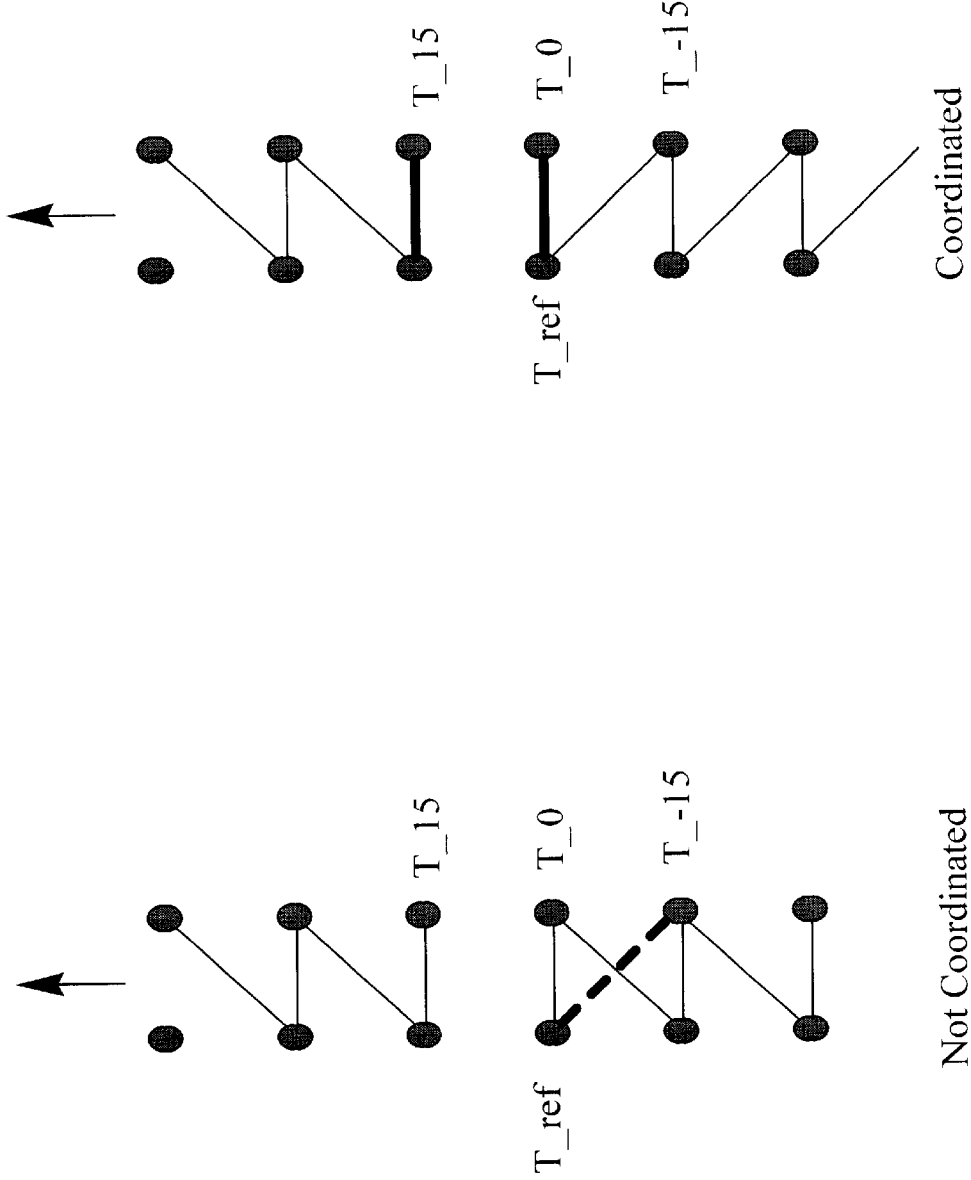
FIGS. 7A and 7B are diagrammatic representations of the establishment and severing of neighbor ISLs in a non-coordinated manner, and in a coordinate manner according to the present invention, respectively.

FIGS. 7A and 7B are diagrammatic representations of the establishment and severing of neighbor ISLs in a non-coordinated manner, and in a coordinate manner according to the present invention, respectively. The neighbor connectivity algorithm combined with the very slow skew slip causes the particular satellite to remain connected to the same two neighbors in an adjacent plane over many consecutive passes. The reference satellite in the higher altitude orbit will select a particular satellite as the destination for one of its two neighbor links from the time that satellite is at a −15° offset until it is at a +15° offset. This corresponds to 210 orbits or about 16.5 days. For the first 8 days, the reference satellite's other neighbor link connects it to the satellite ahead of this particular satellite and for the next 8 days the reference satellite's other neighbor link connects it to the satellite which is trailing.

At some point, (nominally when the offset has reached 15° and the skew is 0°), the satellite will stop establishing neighbor links with this more distant neighbor each pass and begin connecting with a new neighbor at approximately −15° offset. The same description of neighbor connectivity applies to all of the satellites, which are co-planar with T_ref. Each will also have been connected with a particular pair of satellites for the same period of time. On the pass that it is decided that satellite T_ref should establish a connection to a new neighbor, the same decision should be made for all of the other satellites within the plane. This decision process must be coordinated among the satellites, and once one satellite changes connectivity, all of the satellites must also employ the same connectivity.

FIG. 7A illustrates the situation that occurs when this decision process is not coordinated. Here, T_ref makes the decision to stop establishing neighbor links with T_15 and start connecting with T_−15. However, the satellites trailing T_ref do not make similar decisions. As a result, satellites in the reference plane attempt to establish a total of 3 neighbor links to T_−15. However, according to the present example, each satellite can have a maximum number of two neighbor links with the satellites in each adjacent neighbor plane.

FIG. 7B illustrates a coordinated neighbor link decision. As shown, during this pass, satellites T_15 and T_0 will have a single neighbor link to the plane containing T_ref. This single link situation only occurs for the satellites associated with the first satellite in the reference plane to switch connectivity. Thus, it is beneficial to adjust the timing of the decision to switch connectivity until the traffic expected on these links is relatively low.

This ripple of a single neighbor link will occur on both the ascending and descending pass, but the choice for the timing of each can be made somewhat independently. As shown in FIG. 6, it is possible to delay or advance this decision by a few hours without significant impact on the neighbor link range. This could allow time for the ascending or descending half planes to move to an area where less neighbor link traffic is required (potentially over an ocean) thus minimizing the impact of the pair of satellites each with only one westward neighbor link.

Figure 8:
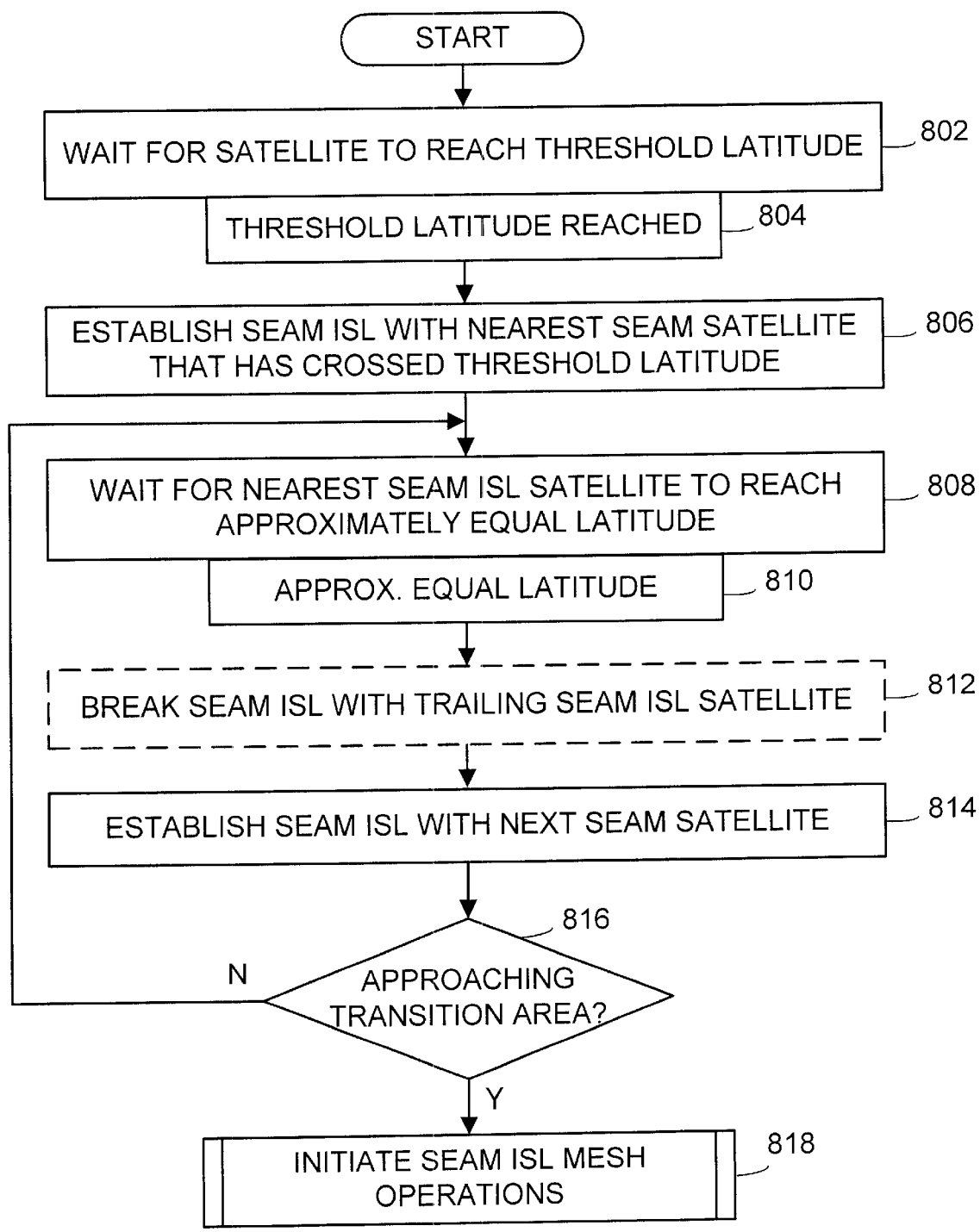
FIG. 8 is a logic diagram illustrating operation according to the present invention in managing seam ISLs in the teardrop area.

FIG. 8 is a logic diagram illustrating operation according to the present invention in managing seam ISLs in the teardrop area. The spacing between planes 1 and 12 has been designed to ensure continuous coverage in the two teardrop areas. A result is that the crossover points (in the mesh area) between these planes often falls over population centers. Specifically, planes 1 and 12 cross over at approximately 46.0° latitude.

The greatest range rate and angular rate between satellites for which ISLs are considered occur around the crossover points. The angular and range tracking limitations of the ISL transmit and receive equipment providing the seam links must be addressed by the algorithm for connectivity near crossover points.

As described in the preceding section, the neighbor link algorithm calls for the ISLs to be broken prior to the crossover point and then reestablished after the crossover point. This avoids having to maintain the ISLs in this very dynamic area. This approach is possible since the crossover occurs at 84.6°, which is well beyond population centers. The much lower latitude crossover point of the seam planes, putting the mesh area over high traffic areas, demands a more sophisticated approach to seam link connectivity around the crossover point. The approach must ensure that the traffic from satellites in the mesh area can be carried without a significant increase in the number of hops required.

In the mesh area, there exists a significant overlap of the footprints from satellites in planes 1, 2, 11 and 12. The seam link algorithm described below makes use of this and the fact that each earth cell is serviced by only one satellite at any given time. The choice of satellite or plane to provide service is made in a way that simplifies seam link connectivity in the mesh area.

The algorithm for seam links addresses both the teardrop area and the mesh area. Since the algorithm for the teardrop area is the basis for both, it is described first. The algorithm for the mesh area is built on the teardrop algorithm, but with significant modifications to accommodate the mesh area constraints.

There are two seams in the constellation separated by 180° in longitude. For the purpose of description of the algorithms, the seam which occurs between satellites in plane 1 in an ascending pass and satellites in plane 12 in a descending pass is considered. At this seam, satellites in plane 1 start each pass in the teardrop area and then enter the mesh area, whereas satellites in plane 12 start in the mesh area and then move to the teardrop area. The approach for ISL connectivity for the other seam is similar.

The algorithm for seam link connectivity in the teardrop area is:

For each satellite in a seam area (nominally those in plane 1 and 12), seam links are established and broken at regular intervals throughout an ascending or descending pass.

For a satellite in plane 1 on an ascending pass, a seam link is established after the satellite reaches (70° S) latitude connecting it to the nearest satellite in plane 12 which is north of (70° S) latitude. Near the point where the plane 1 satellite and first plane 12 satellite are at the same latitude, the second seam link is established to the satellite trailing the first satellite in plane 12. Near the time when the plane 1 satellite and this second satellite are at the same latitude, the first seam link is broken and a new seam link to the next satellite in plane 12 is established. This continues until the plane 1 satellite approaches the mesh area.

Seam links for a satellite in plane 1 on a descending pass follow the same algorithm with (70° N) as the limiting latitude.

The general description for connectivity applies to satellites in plane 12 once they have passed beyond the mesh area and continues until they reach 70° latitude.

Referring particularly to FIG. 8, teardrop area seam ISL operations for a particular satellite commence by waiting for the satellite to reach the threshold latitude (step 802). For an ascending pass, the threshold latitude is 70° S while on a descending pass, the threshold latitude is 70° N. When this threshold latitude is reached (step 804), a seam ISL is established with the nearest seam ISL satellite that has crossed the threshold latitude (step 806).

After this first seam ISL is established, no additional ISLs are established or severed until the nearest seam ISL satellite reaches approximately an equal latitude (step 808). When this condition is met (step 810), the seam ISL with a trailing seam ISL satellite is broken (step 812). Of course, during a first execution of step 812, there is no such seam ISL to break. However, on subsequent executions of step 812, such a seam ISL is available to break. Then, a new seam ISL is established with the next seam satellite (step 814).

When the satellite approaches a transition area (as determined at step 816), seam ISL mesh operations are initiated. Otherwise, operation returns to step 808. Seam ISL operations are described immediately with reference to FIG. 9. Thus, until the satellite approaches the transition area, the operation of FIG. 8 continues. Likewise, as will be described with reference to FIG. 9, once seam ISL mesh operations are completed, the teardrop area operations of FIG. 8 commence again.

Figure 9:
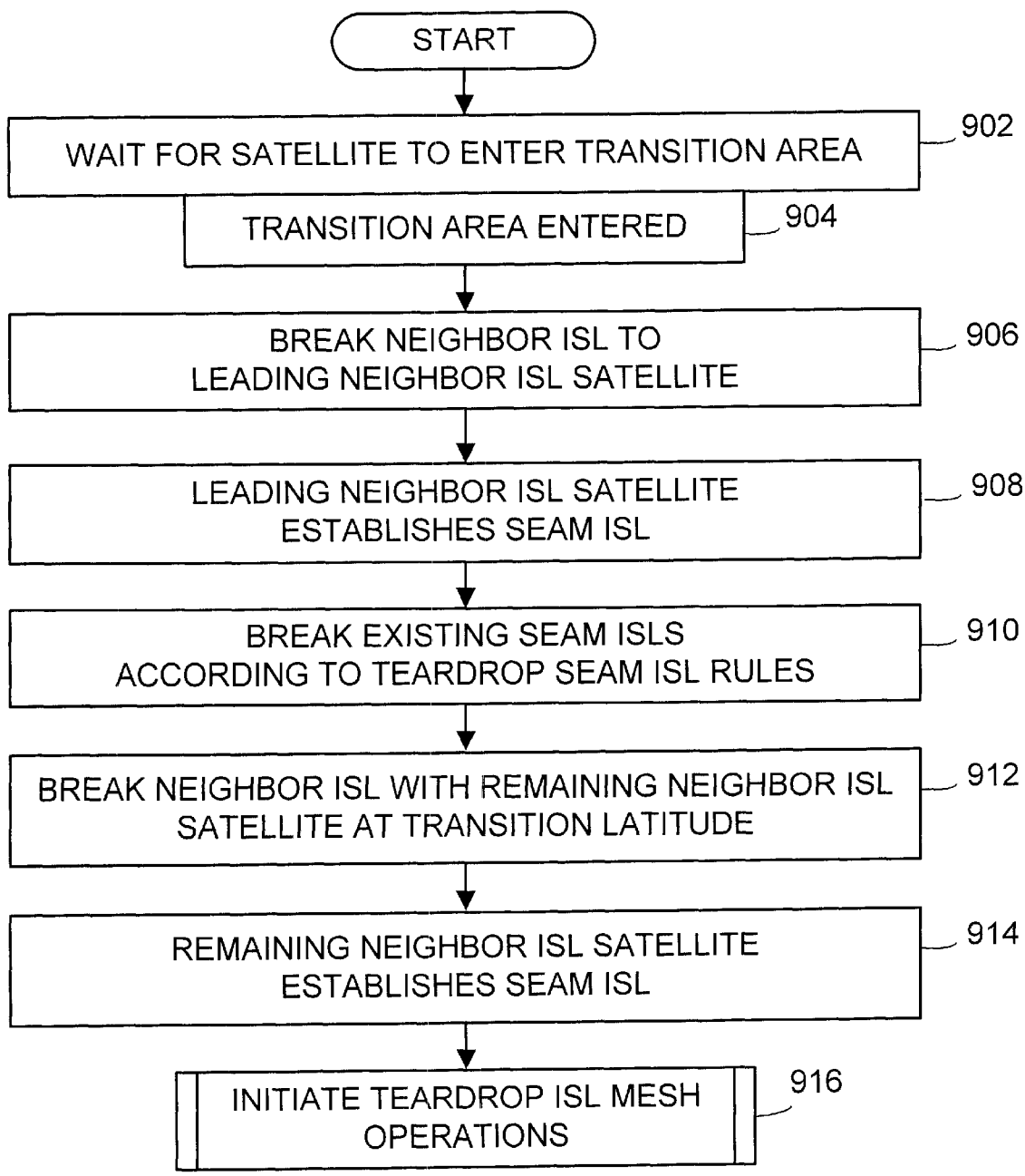
FIG. 9 is a logic diagram illustrating operation according to the present invention in managing seam ISLs in the mesh area.

FIG. 9 is a logic diagram illustrating operation according to the present invention in managing seam ISLs in the mesh area. The algorithm for mesh area ISL connectivity requires that the coverage area for which a satellite in plane 1 is responsible be reduced as it ascends toward the coverage overlap area of planes 2 and 12. Once the coverage responsibility for the plane 1 satellite has been reduced to zero, all seam links and neighbor links can be broken. The lowest latitude at which the coverage can go to zero is around 42.6° which is 7.5° beyond the 35.1° latitude coverage overlap point for planes 2 and 12. The portion of the plane 1 satellite's orbit between 35.1° N latitude and 42.6° N latitude is called the transition area. In this area, the number of inter-plane links is reduced from 4 upon entering to 0 upon exiting.

Referring to FIG. 9, operation commences by waiting for the satellite to enter the transition area (step 902). Once the transition area is entered (step 904), the neighbor ISL to the leading neighbor ISL satellite is broken (step 906). However, instead of establishing a new neighbor ISL, the satellite does not establish a new neighbor ISL and continues with a single neighbor ISL. Then, the leading neighbor ISL satellite with which the neighbor ISL was broken, establishes a seam ISL according to the teardrop area seam ISL rules (step 908). In such case, for example, a satellite of plane 1 breaks its neighbor ISL to a satellite of plane 2. Then, the satellite of plane 2 establishes a seam ISL to a satellite of plane 12.

Next, the satellite breaks its existing seam ISLs according to the teardrop area seam ISL rules (step 910). However, the satellite does not establish new seam ISLs when these ISLs are dropped. Then, the satellite breaks its remaining neighbor ISL at a transition latitude (step 912). The remaining neighbor ISL satellite with which the ISL was severed at step 912 then establishes a seam ISL (step 914).

At this point, assuming that all seam ISLs have been severed, the satellite has no neighbor ISL links or seam ISL links and its only links are intra-plane ISLs. This operation continues until new ISLs are established in teardrop area ISL operations (step 916) and neighbor link operations (described with reference to FIG. 3).

Figure 10:
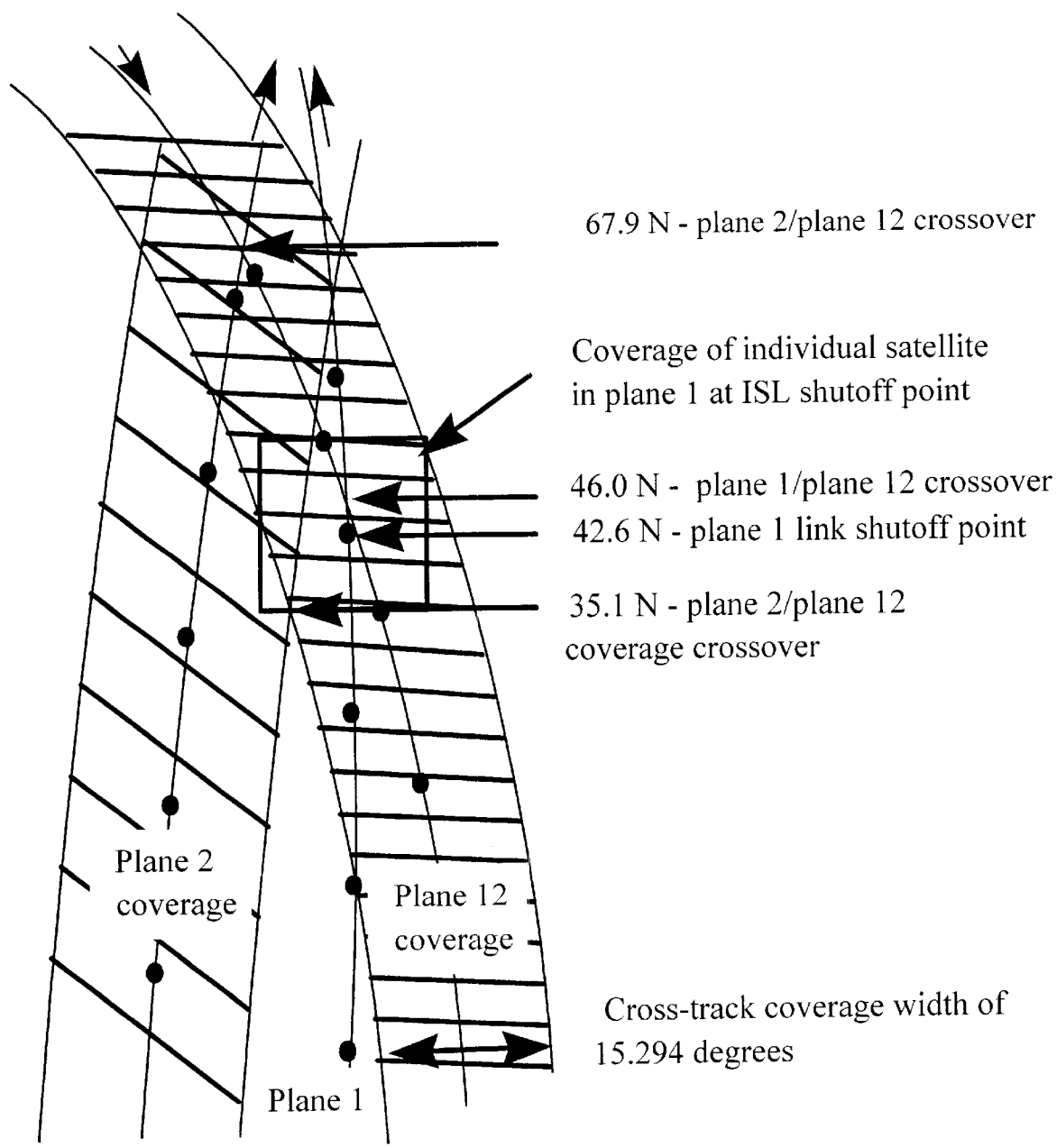
FIG. 10 is a diagram illustrating an example of operation according to the present invention in managing seam ISLs in the mesh area.

FIG. 10 is a diagram illustrating an example of operation according to the present invention in managing seam ISLs in the mesh area. The coverage responsibility for satellites in plane 2 and 12 as they near the plane 2/plane 12 crossover point will be established for the particular embodiment so as to minimize any overlap. One approach calls for the coverage area of plane 2 satellites to be reduced to zero near the crossover in a similar manner. This could increase distance from the crossover at which the inter-plane ISLs could be broken without affecting routing performance.

The algorithm for inter-plane link connectivity inside the mesh area is described using a satellite in plane 1 entering the mesh area on an ascending pass as the example:

Once the plane 1 satellite reaches a latitude of 35.1° (enters the transition area):

The leading neighbor link to plane 2 will be broken. The destination satellite in plane 2 then establishes a seam link with the closest rising satellite in plane 12. (This will be the second seam link for this plane 2 satellite.)

Seam links with plane 12 will be broken according to the rules for the teardrop area. However, no new seam links to plane 12 will be established from the plane 1 satellite when an existing one is broken. However, if a seam link was broken prior to the plane 1 satellite entering the transition area, and a new seam link could not be established at that time due to ISL interference or tracking constraints, that new seam link may be established after the plane 1 satellite enters the transition area. For example, if a seam link is broken when the plane 1 satellite is at 34° N, then the plane 12 destination satellite for the new seam link is at approximately 49° N and it has not yet reached the cross-over point of planes 1 and 12. A new seam link cannot be established until the plane 12 satellite has at least reached the cross-over point of 46° N. By this time, the plane 1 satellite will be within the transition area at 37° N.

Once the plane 1 satellite reaches a latitude of 42.6°
The remaining neighbor link is broken. The destination satellite in plane 2 then establishes a seam link with the closest rising satellite in plane 12.

The selection of the transition area has the result that as the satellite reaches the end of the transition area it will have one seam link to plane 12. This remaining seam link is broken. The destination satellite in plane 12 will have left the mesh area by this time will follow the teardrop area algorithm for establishing and breaking seam links with other satellites in plane 1.

The seam links between satellites in planes 2 and 12 that were created during the plane 1 satellite's crossing of the transition area are established and broken according to the description for the teardrop area until one or the other satellite is within a certain number of degrees (depending upon the embodiment) of the cross-over point between the two planes.

While this algorithm results in a configuration where the plane 1 satellite has responsibility for covering an area at the same time that it only has 2 inter-plane links, the size of the coverage area has been reduced to the point that it should be possible to support the traffic volume on the total of 4 ISLs.

The algorithm for the other mesh area is identical in approach. However, to equalize the work load between planes 1 and 12, the algorithm is modified so that planes 1 and 11 provide the coverage beyond the plane 1/plane 12 crossover while the plane 12 coverage goes to zero.

Figure 11:
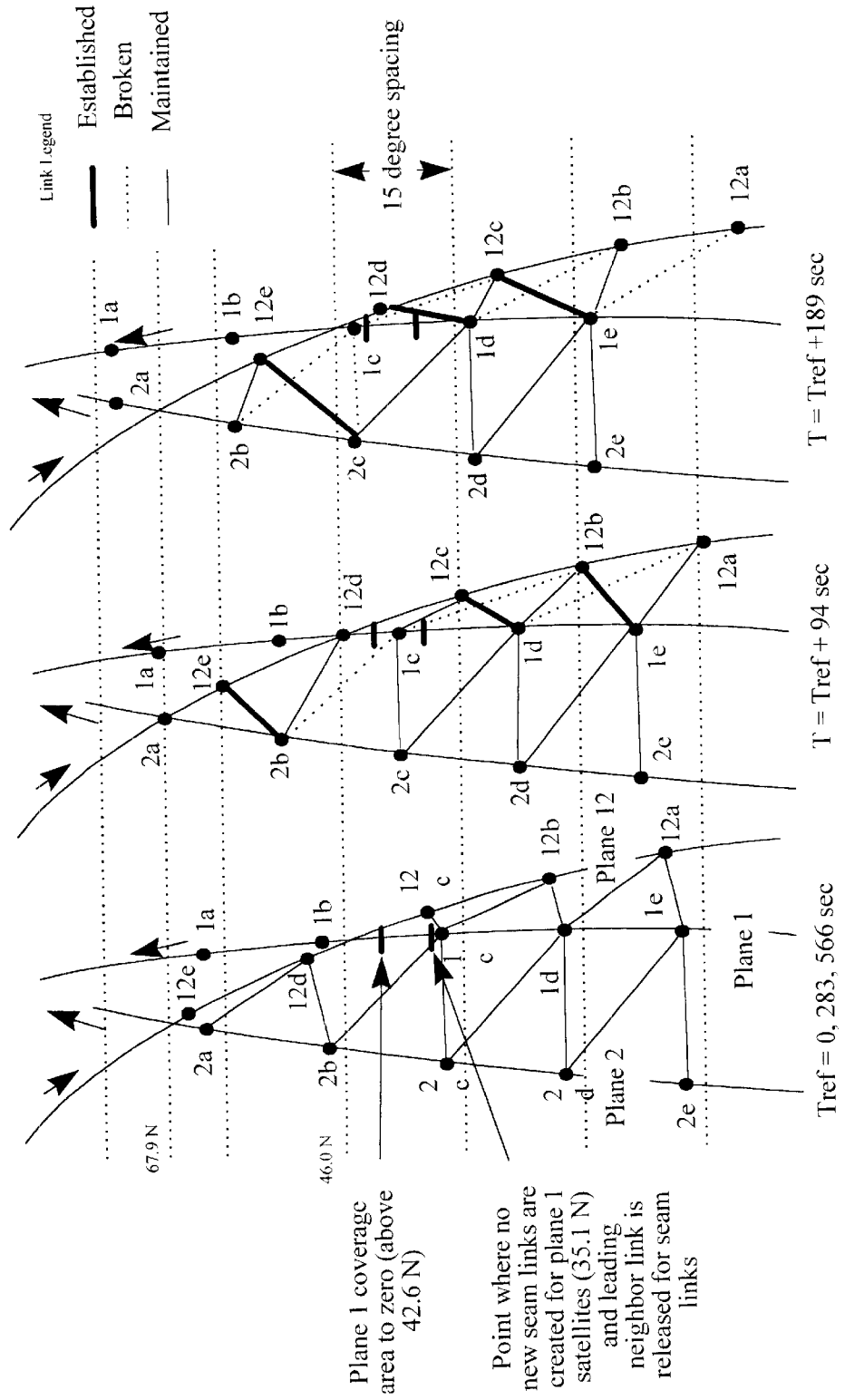
FIG. 11 is a diagram illustrating an example of operation according to the present invention in managing seam ISLs in the mesh area over time.

FIG. 11 is a diagram illustrating an example of operation according to the present invention in managing seam ISLs in the mesh area over time. At 1365 km altitude, a plane 1 satellite will travel 15° in 282.54 seconds. At 1387 km altitude, a plane 12 satellite will travel 15° in 283.74. All other orbits lie between these two in altitude and thus in time required for traveling 15°. A result is that in 283 seconds the relative alignment of the constellation will roughly repeat. (Satellites in lower planes will have traveled slightly more and those in higher planes slightly less than 15°.)

FIG. 11 shows the satellites in and around the mesh area at three points in time. The second diagram is 94 seconds (~5°) advanced from the first, the third is 95 seconds (~5°) advanced from the second. As a result of the 283 second repeating period, the first is also ~5° advanced from the third. Of course, for this last case, all of the satellite labels in the first diagram need to be shifted by 1 position. The satellite labeled 2d in the first diagram is 5° advanced from the satellite labeled 2e in the third.

The following primarily considers the link connectivity for satellite 1c and the 4 satellites which are initially connected with it via inter-plane ISLs as 1c crosses the transition area.

The first diagram shows the connectivity just prior to 1c entering the transition area. It has neighbor links with 2c and 2b (the plane 1/plane 2 skew is slightly positive, so plane 1 satellite neighbor links point west and northwest) and has seam links with 12c and 12b. Satellite 2c is maintaining the neighbor links established at the start of the pass. Satellite 2b has already had one of its two neighbor links with plane 1 (the one that was formerly to satellite 1b) reassigned to seam connectivity and has established a seam link with 12d. Satellite 12b has entered the teardrop area, has established two seam links and will continue to follow the teardrop area algorithm for the remainder of this descending pass. Its seam link with 1c is nearing the point where it will be broken. Satellite 12c only has the 1 seam link which is connected to 1c.

Satellite 1c has entered the transition area in the second diagram. It has a neighbor link with 2c and a seam link with 12c. The neighbor link with 2b was broken upon 1c entering the transition area and 2b has reassigned this link for seam link connectivity, establishing a link with 12e. The seam link with 12b was disconnected based on the offset between the satellites. Satellite 12b has established a new seam link to 1e. Satellite 2c is maintaining the neighbor links established at the start of the pass. Satellite 2b now has 2 seam links. Satellite 12c has established its second seam link to 1d.

Though the time resolution of the diagrams is not fine enough to show this, when 1c entered the transition region, it still had 2 seam links. The one to 12b was broken just after 1c entered the region. Thus, 1c does not attempt to establish a new seam link. However, if the link had broken just prior to 1c entering the transition region, 1c would then attempt to establish a seam link with 12d. At the time that 1c enters the transition region, 12d has not passed the cross-over point of planes 1 and 12. 1c would then need to wait until 12d had passed the crossover point by a number of degrees before attempting to establish the link. The particular number of degrees to be used is determined by the combination of ISL beamwidth, slew rate, and angular viewing limitations. Also, if the particular selection of one of the two ISLs used for seam links will provide an angular advantage for this seam link (the ISL mounted on the leading edge of the satellite may have better forward viewing angles) this can be planned for and incorporated at the start of the ascending pass for plane 1.

Satellite 1c has left the transition area in the third diagram. It no longer has any earth cell coverage responsibility and does not have any neighbor or seam links. The neighbor link with 2c was broken upon 1c leaving the transition area and 2c has reassigned this link for seam link connectivity, establishing a link with 12e. The seam link with 12c was broken upon 1c leaving the transition area. Satellite 12c has entered the teardrop area, has established a second seam link to 1e and will continue to follow the teardrop area algorithm for the remainder of this descending pass. When satellites 2b and 12e reached the same latitude, 2b broke its seam link with 12d. Satellite 2b then establishes a seam link with satellite 12f (not shown) once the spacing between them permits it.

At the time when satellite 1c reaches the end of the transition area, 2c and 12d are at approximately the same latitude. A seam link could be established between 2c and 12d. Instead, satellite 2c chooses to establish the link with 12e. Satellite 2c has only one seam link, this choice is made to maximize the connection time. At about the time the 2c/12e link would need to be broken, the second neighbor link of 2c (with 1c) will be broken and the ISL will be available for seam connectivity. As a result, once 2c begins linking with plane 12, it will always have at least 1 link to that plane.

Figure 12:
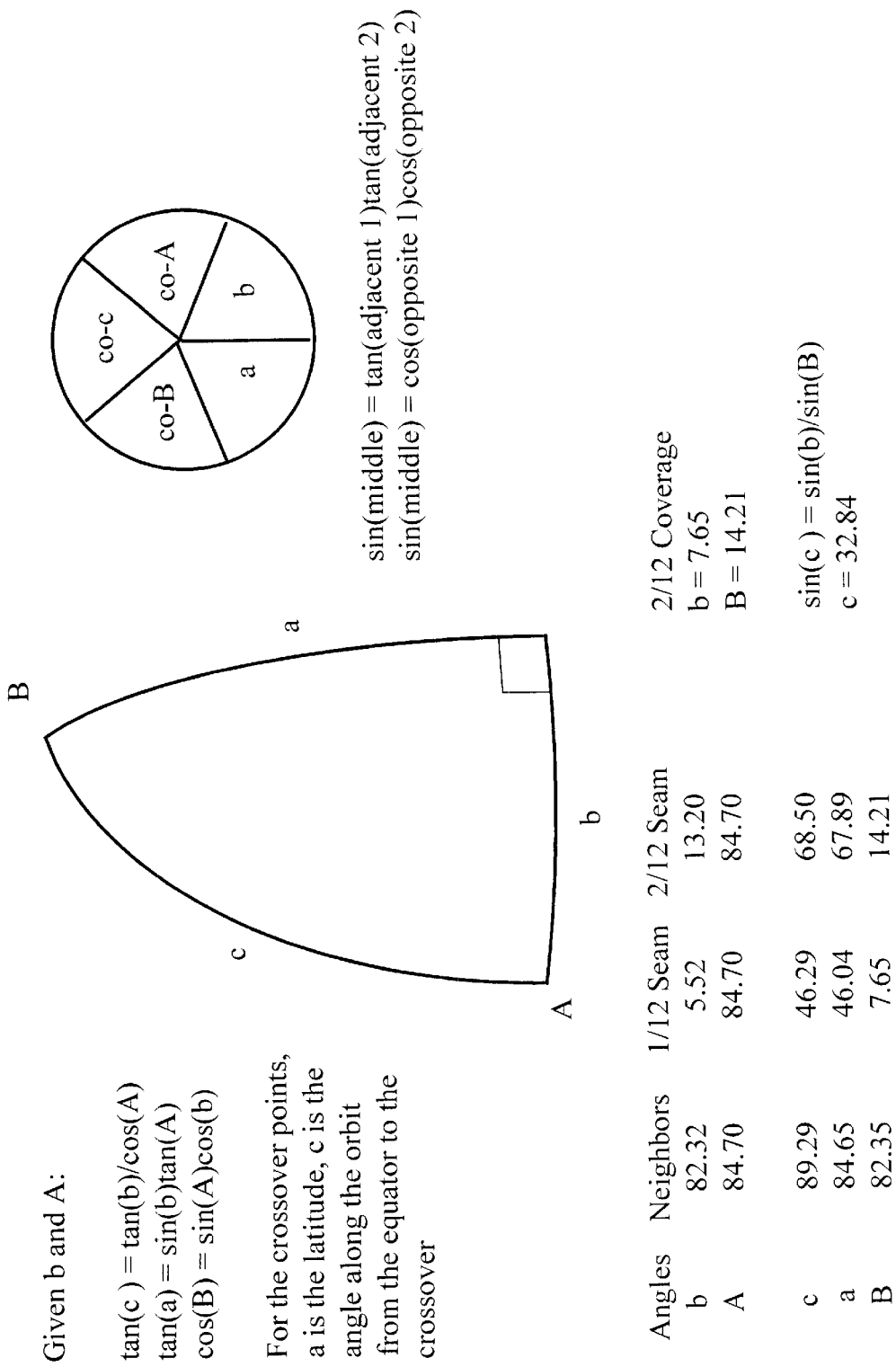
FIG. 12 is a diagram illustrating an example of the calculation of orbit crossover points for further use in managing seam ISLs.

FIG. 12 is diagram illustrating an example of the calculation of orbit crossover points. For 84.7° inclination and 15.36° nodal separation, adjacent planes cross over at a point which is 0.714° prior to the eastern plane reaching its most northern latitude and 0.714° following the western plane reaching its most northern latitude. The arc c is the angular distance in the orbit between the equator and the crossover point. The angle A is the orbital inclination, and b is the longitude separation from the ascending node of the eastward plane to the crossover point and is determined as 90−(15.36/2), i.e., the crossover point occurs half way between the northernmost points of the two orbits.

The latitude of the seam crossover point between planes 1 and 12 is 46.04° (again 84.7° is used for the inclination angle of each orbit). The angle b is half of the separation between the ascending node of plane 1 and the descending node of plane 12. The ascending node of plane 12 is 11×15.36=168.96° away from that of plane 1, and the descending node of plane 12 (180° away from the ascending node) is 11.04° separated.

The latitude of the seam crossover point between planes 2 and 12 is 67.89° (again 84.7° is used for the inclination angle of each orbit). The angle b is half of the separation between the ascending node of plane 2 and the descending node of plane 12. This is (15.36+11.04)/2=13.20°. The latitude of the coverage crossover point between planes 2 and 12 is determined from the latitude of the crossover point of these planes, the angle at that crossover and the cross-track coverage width. From the 2/12 crossover calculation, the latitude is 67.89°. The angle needed for this calculation is half the angle of intersection between the planes which is 14.21° (angle B). The cross-track width to be 15.294. The angle b is ½ that value. The side labeled a in corresponds to a segment of the plane 12 orbit. The angle c (calculated to be 32.84) is the separation angle from the crossover point of planes 2 and 12 to the crossover point of the coverage of these two planes. The latitude of the coverage crossover is then 67.89−32.84=35.05°.

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A computer readable medium containing software instructions that, upon execution by at least one digital computer, causes the at least one digital computer to manage intersatellite links in a low earth orbit satellite system for a satellite operating in an orbital plane, the computer readable medium comprising:

a plurality of software instructions that cause the digital computer to operate to cause the satellite to establish an initial set of neighbor intersatellite links to satellites of a neighboring orbital plane to produce minimum offset;

a plurality of software instructions that cause the digital computer to determine that the initial set of neighbor intersatellite links to the satellites of the neighboring orbital plane will not produce minimum offset for a subsequent pass;

a plurality of software instructions that cause the digital computer to operate to cause the satellite to establish a new set of neighbor intersatellite links to satellites of the neighboring orbital plane to produce minimum offset in a subsequent pass;

a plurality of software instructions that cause the digital computer to determine that establishing the new set of neighbor intersatellite links should be delayed to reduce the affect on communication load; and a plurality of software instructions that cause the digital computer to operate to cause the satellite to establish the new set of neighbor intersatellite links after a delay.

2. The computer readable medium of claim 1, further comprising:

a plurality of software instructions that cause the digital computer to operate to cause the satellite to sever one of the initial set of neighbor intersatellite links to a satellite of the neighboring orbital plane; and a plurality of software instructions that cause the digital computer to operate to cause the satellite to establish a new neighbor intersatellite link to a satellite of the neighboring orbital plane.

3. The computer readable medium of claim 1, further comprising:

a plurality of software instructions that cause the digital computer to operate to cause the satellite to establish an intrasatellite link to a leading satellite in the orbital plane; and a plurality of software instructions that cause the digital computer to operate to cause the satellite to establish an intrasatellite link to a trailing satellite in the orbital plane.

4. The computer readable medium of claim 1, further comprising a plurality of software instructions that cause the digital computer to operate to cause the satellite to sever a plurality of seam intersatellite links to satellites in a neighboring orbital plane.

5. A computer readable medium containing software instructions that, upon execution by at least one digital computer, causes the at least one digital computer to manage intersatellite links in a low earth orbit satellite system for a satellite operating in an orbital plane, the computer readable medium comprising:

a plurality of software instructions that cause the digital computer to determine that a transition area has been entered;

a plurality of software instructions that cause the digital computer to operate to cause the satellite to sever a neighbor intersatellite link with a leading neighbor satellite in a neighboring orbital plane;

a plurality of software instructions that cause the digital computer to operate to cause the satellite to sever a remaining neighbor intersatellite link with a remaining neighbor satellite in a neighboring orbital plane; and a plurality of software instructions that cause the digital computer to operate to cause the satellite to sever all seam intersatellite links with satellites in a seam orbital plane.

6. The computer readable medium of claim 5, further comprising:

a plurality of software instructions that cause the digital computer to operate to cause the leading neighbor satellite to establish a seam satellite link with a satellite in the seam orbital plane; and a plurality of software instructions that cause the digital computer to operate to cause the remaining neighbor satellite establishing a seam satellite link with a satellite in the seam orbital plane.

7. The computer readable medium of claim 5, further comprising a plurality of software instructions that cause the digital computer to operate to cause the satellite to, after severing the neighbor intersatellite links and the seam intersatellite links, to maintain only intersatellite links with satellites in the orbital plane.

8. The computer readable medium of claim 5, further comprising a plurality of software instructions that cause the digital computer to operate to cause the satellite to, after severing the neighbor intersatellite links and the seam intersatellite links, to maintain only intersatellite links with satellites in the orbital plane.

9. A computer readable medium containing software instructions that, upon execution by at least one digital computer, causes the at least one digital computer to manage intersatellite links in a low earth orbit satellite system for a satellite operating in an orbital plane, the computer readable medium comprising:

a plurality of software instructions that cause the digital computer to operate to cause the satellite to establish an initial set of neighbor intersatellite links to satellites of a neighboring orbital plane to produce minimum offset;

a plurality of software instructions that cause the digital computer to determine that the initial set of neighbor intersatellite links to the satellites of the neighboring orbital plane will not produce minimum offset for a subsequent pass;

a plurality of software instructions that cause the digital computer to operate to cause the satellite to, when entering a mesh area, sever all neighbor intersatellite links; and a plurality of software instructions that cause the digital computer to operate to cause the satellite to establish a new set of neighbor intersatellite links to satellites of the neighboring orbital plane to produce minimum offset in a subsequent pass.

10. A computer readable medium containing software instructions that, upon execution by at least one digital computer, causes the at least one digital computer to manage intersatellite links in a low earth orbit satellite system for a satellite operating in an orbital plane, the computer readable medium comprising:

a plurality of software instructions that cause the digital computer to determine that the satellite has reached a threshold latitude;

a plurality of software instructions that cause the digital computer to operate to cause the satellite to establish a seam intersatellite link with a nearest satellite in a seam orbital plane; and a plurality of software instructions that cause the digital computer to operate to cause the satellite to, when the nearest satellite in the seam orbital plane is at an approximately equal latitude, establish a seam intersatellite link with a next satellite in the seam orbital plane.

11. The computer readable medium of claim 10, further comprising a plurality of software instructions that cause the digital computer to operate to cause the satellite, prior to establishing the seam intersatellite link with the next satellite in the seam orbital plane, to sever a furthest seam intersatellite link with a satellite in the seam orbital plane.

12. The computer readable medium of claim 10, further comprising a plurality of software instructions that cause the digital computer to operate to cause the satellite to cease to establish seam intersatellite links when approaching a transition area.

13. A method for managing intersatellite links in a low earth orbit satellite system for a satellite operating in an orbital plane, the method comprising:

establishing an initial set of neighbor intersatellite links to satellites of a neighboring orbital plane to produce minimum offset;

determining that the initial set of neighbor intersatellite links to the satellites of the neighboring orbital plane will not produce minimum offset for a subsequent pass;

establishing a new set of neighbor intersatellite links to satellites of the neighboring orbital plane to produce minimum offset in a subsequent pass;

determining that establishing the new set of neighbor intersatellite links should be delayed to reduce the affect on communication load; and establishing the new set of neighbor intersatellite links after a delay.

14. The method of claim 13, wherein establishing the new set of neighbor intersatellite links comprises:

severing one of the initial set of neighbor intersatellite links to a satellite of the neighboring orbital plane; and establishing a new neighbor intersatellite link to a satellite of the neighboring orbital plane.

15. The method of claim 13, further comprising:

establishing an intrasatellite link to a leading satellite in the orbital plane; and establishing an intrasatellite link to a trailing satellite in the orbital plane.

16. The method of claim 13, further comprising establishing and severing a plurality of seam intersatellite links to satellites in a seam orbital plane.

17. A method for managing intersatellite links in a low earth orbit satellite system for a satellite operating in an orbital plane, the method comprising:

determining that a transition area has been entered;

severing, by the satellite, a neighbor intersatellite link with a leading neighbor satellite in a neighboring orbital plane;

severing, by the satellite, a remaining neighbor intersatellite link with a remaining neighbor satellite in a neighboring orbital plane; and severing, by the satellite, all seam intersatellite links with satellites in a seam orbital plane.

18. The method of claim 17, further comprising:

establishing, by the leading neighbor satellite, a seam satellite link with a satellite in the seam orbital plane; and establishing, by the remaining neighbor satellite, a seam satellite link with a satellite in the seam orbital plane.

19. The method of claim 17, wherein after severing the neighbor intersatellite links and the seam intersatellite links, the satellite maintains only intersatellite links with satellites in the orbital plane.

20. A method for managing intersatellite links in a low earth orbit satellite system for a satellite operating in an orbital plane, the method comprising:

establishing an initial set of neighbor intersatellite links to satellites of a neighboring orbital plane to produce minimum offset;

determining that the initial set of neighbor intersatellite to the satellites of the neighboring orbital plane will not produce minimum offset for a subsequent pass;

severing all neighbor intersatellite links when entering a mesh area; and establishing a new set of neighbor intersatellite links to satellites of the neighboring orbital plane to produce minimum offset in a subsequent pass.

21. The method of claim 20, further comprising:

establishing an intrasatellite link to a leading satellite in the orbital plane; and establishing an intrasatellite link to a trailing satellite in the orbital plane.

22. A method for managing intersatellite links in a low earth orbit satellite system for a satellite operating in an orbital plane, the method comprising:
  determining that a threshold latitude has been reached;
  establishing a seam intersatellite link with a nearest satellite in a seam orbital plane; and
  when the nearest satellite in the seam orbital plane is at an approximately equal latitude, establishing a seam intersatellite link with a next satellite in the seam orbital plane.

23. The method of claim 22, further comprising, prior to establishing the seam intersatellite link with the next satellite in the seam orbital plane, severing a furthest seam intersatellite link with a satellite in the seam orbital plane.

24. The method of claim 22, further comprising ceasing to establish seam intersatellite links when approaching a transition area.

* * * * *